United States Patent
Kang et al.

(10) Patent No.: US 9,152,314 B2
(45) Date of Patent: Oct. 6, 2015

(54) MOBILE TERMINAL AND CONTROLLING METHOD THEREOF

(75) Inventors: Rae Hoon Kang, Seoul (KR); Dong Gwan Im, Seoul (KR); Choon Jae Lee, Gwangju (KR); Seung Hyun Woo, Songpa-gu (KR); Hyun Ho Jee, Seoul (KR); Byoung Zoo Jeong, Seoul (KR); Woo Jin Suh, Seoul (KR); I Su Byun, Seoul (KR); Sang Hyuck Lee, Seoul (KR); Min Jeong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 547 days.

(21) Appl. No.: 12/850,280

(22) Filed: Aug. 4, 2010

(65) Prior Publication Data
US 2011/0128241 A1 Jun. 2, 2011

(30) Foreign Application Priority Data

Nov. 30, 2009 (KR) .......................... 10-2009-0117034
Nov. 30, 2009 (KR) .......................... 10-2009-0117036
Nov. 30, 2009 (KR) .......................... 10-2009-0117037

(51) Int. Cl.
G06F 3/0488 (2013.01)
G06F 3/0486 (2013.01)
G06F 3/0484 (2013.01)
G06F 1/16 (2006.01)
G06F 3/01 (2006.01)
G06F 3/0485 (2013.01)

(52) U.S. Cl.
CPC ............ *G06F 3/0488* (2013.01); *G06F 1/1643* (2013.01); *G06F 1/1647* (2013.01); *G06F 3/016* (2013.01); *G06F 3/0485* (2013.01); *G06F 3/0486* (2013.01); *G06F 3/04845* (2013.01); *G06F 3/04883* (2013.01)

(58) Field of Classification Search
CPC .......................... G06F 3/0486; G06F 3/04845
USPC .......................................... 345/173; 455/566
See application file for complete search history.

(56) References Cited

U.S. PATENT DOCUMENTS

2010/0023895 A1* 1/2010 Benko et al. .................. 715/863
2010/0156887 A1* 6/2010 Lindroos et al. .............. 345/418
2010/0328191 A1* 12/2010 Smith et al. .................... 345/1.3

* cited by examiner

*Primary Examiner* — Kent Chang
*Assistant Examiner* — Chayce Bibbee
(74) *Attorney, Agent, or Firm* — Ked & Associates, LLP

(57) ABSTRACT

A mobile terminal and controlling method thereof are disclosed, by which a terminal can be used in further consideration of user's convenience. The present invention includes displaying at least one object on a display unit of a touchscreen type provided to a front side of a housing of a bar type, if a first touch gesture is performed on the object, enabling the object to move from the main display unit via a first subdisplay unit provided to one lateral side of the housing to a second subdisplay unit of the touchscreen type provided to a backside of the housing, and if a second touch gesture is performed on the object displayed on the second subdisplay unit, enabling the object to move to the main display unit via the first subdisplay unit from the second subdisplay unit. Accordingly, when a touchscreen is attached to at least two sides of a mobile terminal, a terminal user is facilitated to use the mobile terminal in a manner of utilizing how to display the touchscreen provided to the at least two sides.

19 Claims, 26 Drawing Sheets

FIG. 4
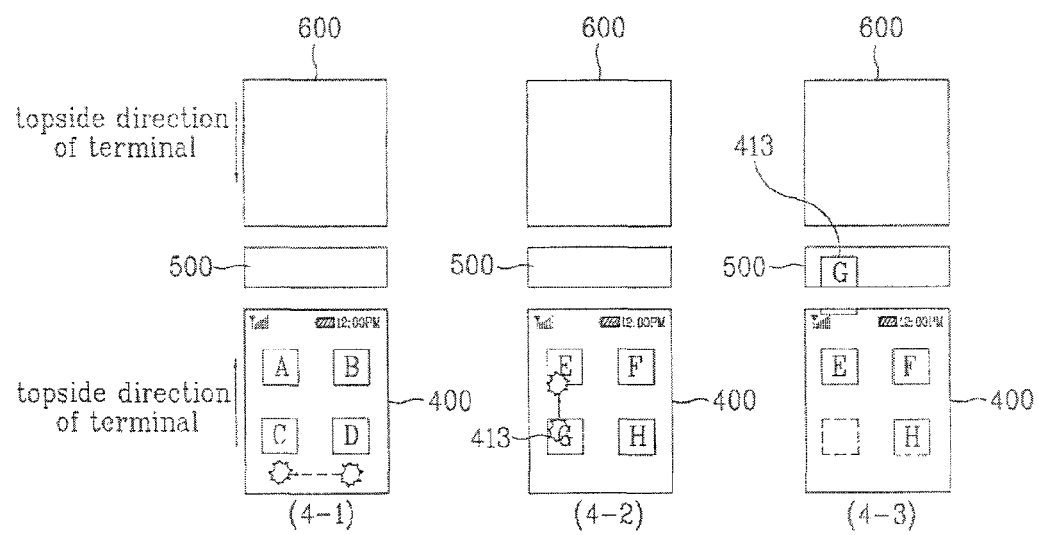
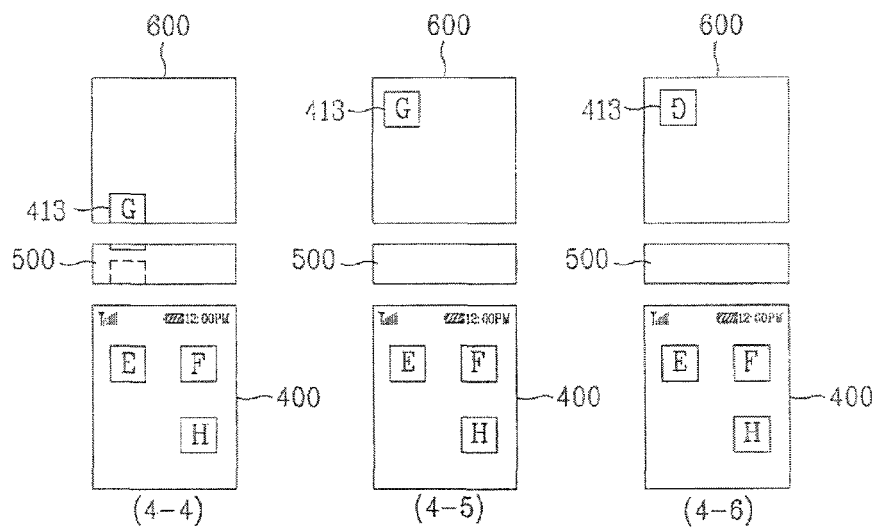

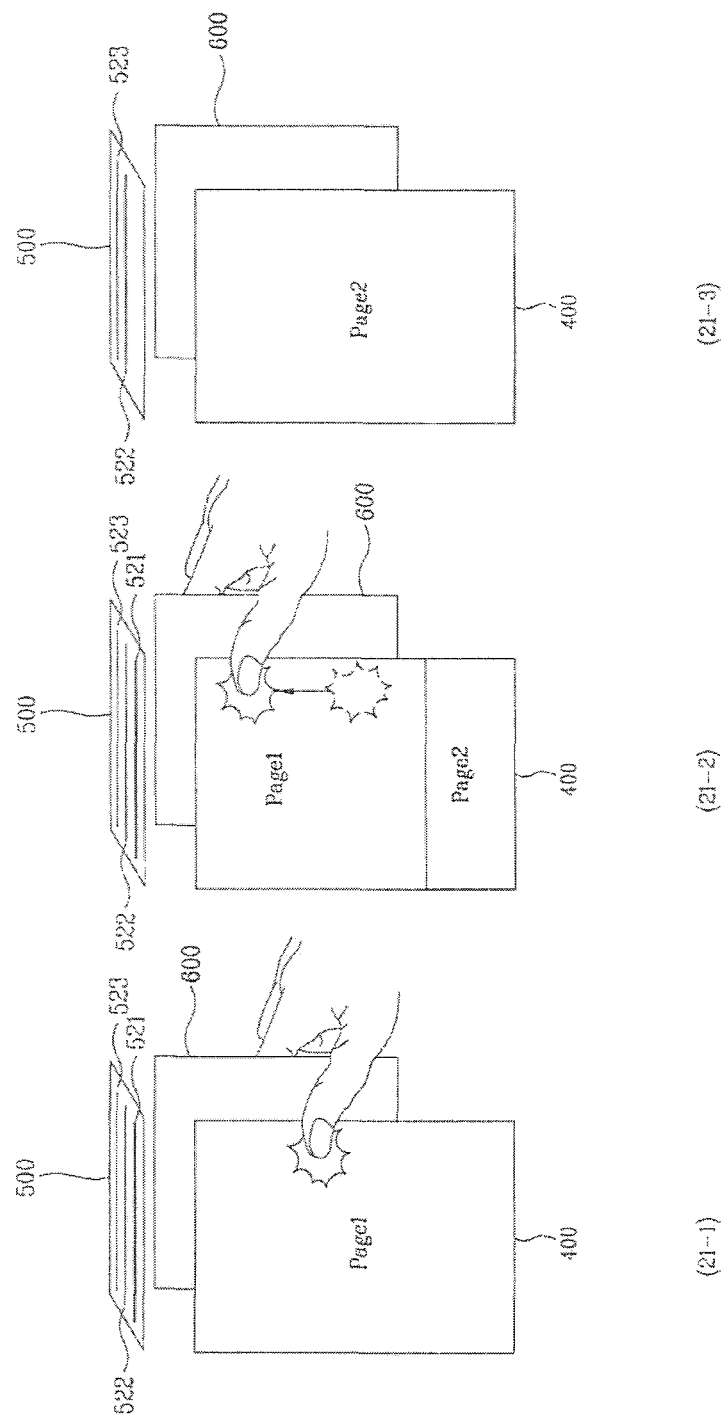

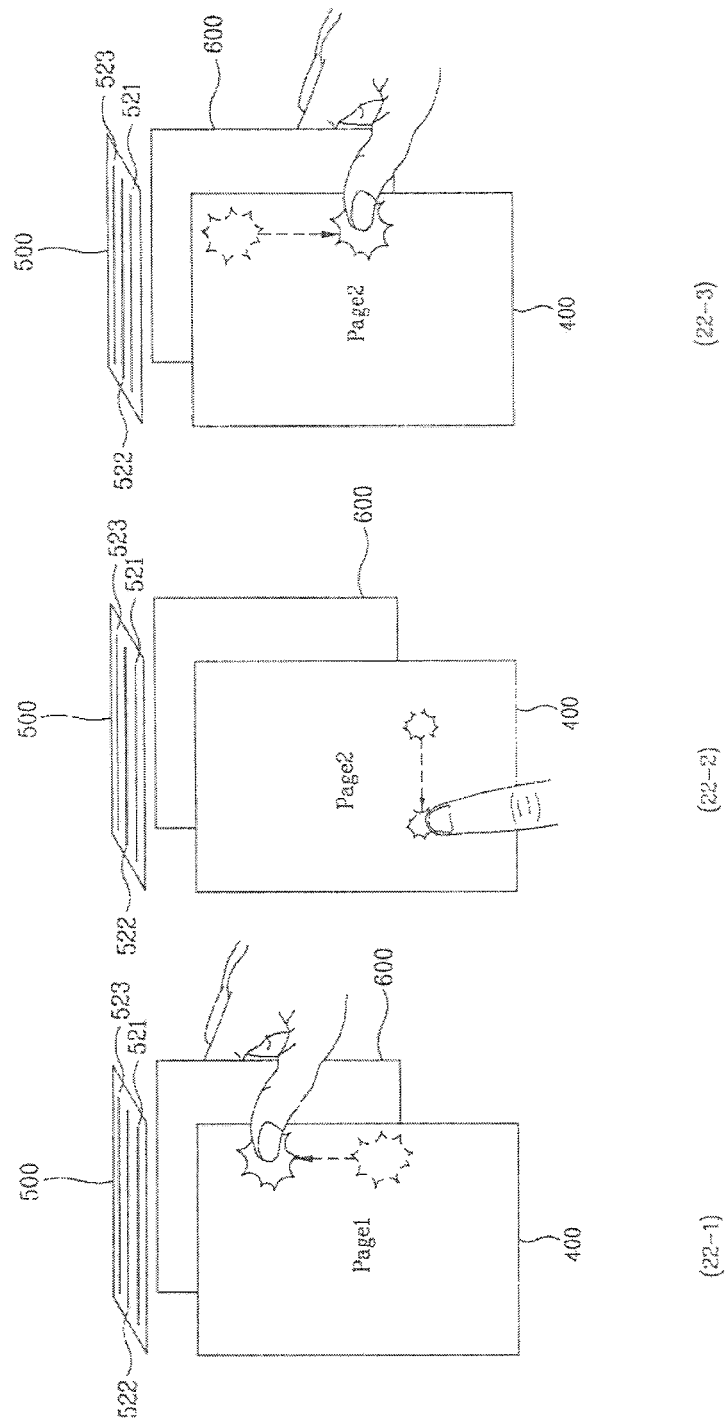

MOBILE TERMINAL AND CONTROLLING METHOD THEREOF

Pursuant to 35 U.S.C. §119(a), this application claims the benefit of earlier filing date and right of priority to Korean Patent Application Nos. 10-2009-0117034, filed on Nov. 30, 2009, 10-2009-0117037, filed on Nov. 30, 2009, 10-2009-0117036, filed on Nov. 30, 2009, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, various kinds of touchscreen type mobile terminals are ongoing to be introduced. A touchscreen used to be provided to one side of a conventional mobile terminal. On the contrary, in case that a touchscreen is provided to at least two sides of a mobile terminal, many efforts need to be made to research and develop a method of displaying the touchscreen provided to the at least two sides of the mobile terminal in order to facilitate a terminal user to use the mobile terminal.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a terminal user is facilitated to use the mobile terminal having a touchscreen provided to at least two sides of the mobile terminal in association with a scheme for displaying the touchscreen provided to the at least two sides of the mobile terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a housing, a main display unit provided to a front side of the housing, a first subdisplay unit provided one lateral side of the housing, a second subdisplay provided to a backside of the housing, and a controller controlling the main display unit, the first subdisplay unit and the second subdisplay unit.

In another aspect of the present invention, a method of controlling a mobile terminal includes displaying at least one object on a display unit of a touchscreen type provided to a front side of a housing of a bar type, if a first touch gesture is performed on the object, enabling the object to move from the main display unit via a first subdisplay unit provided to one lateral side of the housing to a second subdisplay unit of the touchscreen type provided to a backside of the housing, and if a second touch gesture is performed on the object displayed on the second subdisplay unit, enabling the object to move to the main display unit via the first subdisplay unit from the second subdisplay unit.

In another aspect of the present invention, a mobile terminal includes first and second display units of a touchscreen configured to display a list of objects and a controller, if the list is scrolled on the first display unit, controlling the object corresponding to a preset search alphabet or word to be sorted out of the objects of the scrolled list, the controller controls the sorted object to be displayed on the second display unit.

In another aspect of the present invention, a method of controlling a mobile terminal includes displaying a list of objects on a first display unit, setting a search alphabet or word previously, scrolling the list on the first display unit, sorting the object corresponding to the previously set search alphabet or word out of the objects of the scrolled list, and displaying the sorted object on a second display unit.

In another aspect of the present invention, a mobile terminal comprising a housing, a main display unit of a touchscreen provided to a front side of the housing. A first subdisplay unit of the touchscreen provided to one lateral side of the housing, and a controller controlling line-type line symbols corresponding to objects displayable or executable on the main display unit to be displayed on the first subdisplay unit in parallel with one another.

In a further aspect of the present invention, a method of controlling a mobile terminal includes displaying or executing one of a plurality of objects on a main display unit provided to a front side of a housing and displaying line-type line symbols corresponding to a plurality of the object respectively to be provided to a lateral side of the housing in parallel with one another.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4 to 11 are diagrams for configurations of a display screen on which a method of controlling a mobile terminal according to an embodiment of the present invention is implemented;

FIGS. 15 to 22 are diagrams for configurations of a display screen on which a method of controlling a mobile terminal according to an embodiment of the present invention is implemented.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
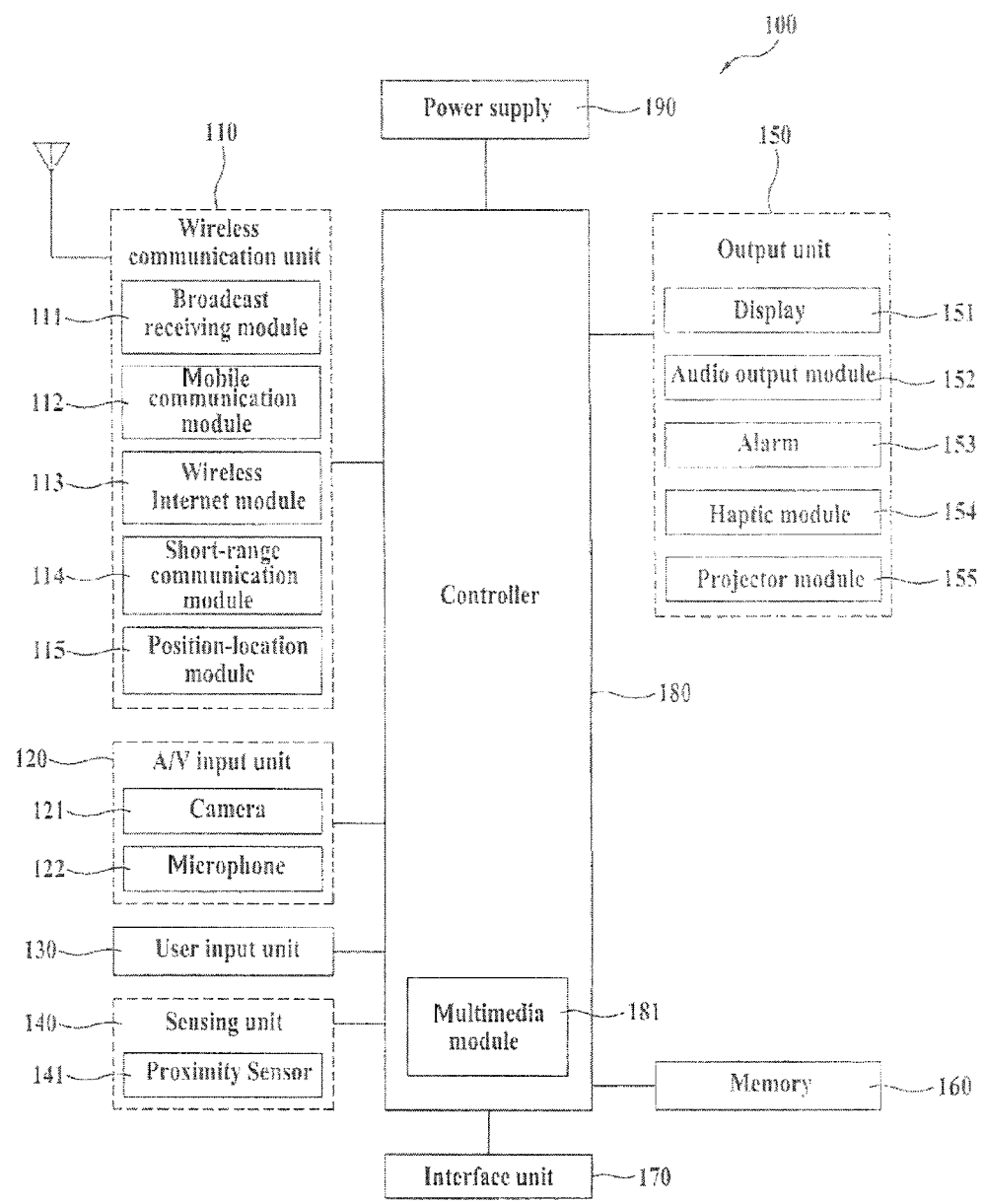
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BOAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless Internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal.

The sensing unit 140 can include at least one of a gravity sensor, a geomagnetic sensor and the like, by which the present invention is non-limited.

In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

Alternatively, a single display module such as a flexible display module can be provided to the mobile terminal in a manner of covering at least two sides of the mobile terminal 100. This shall be explained later.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
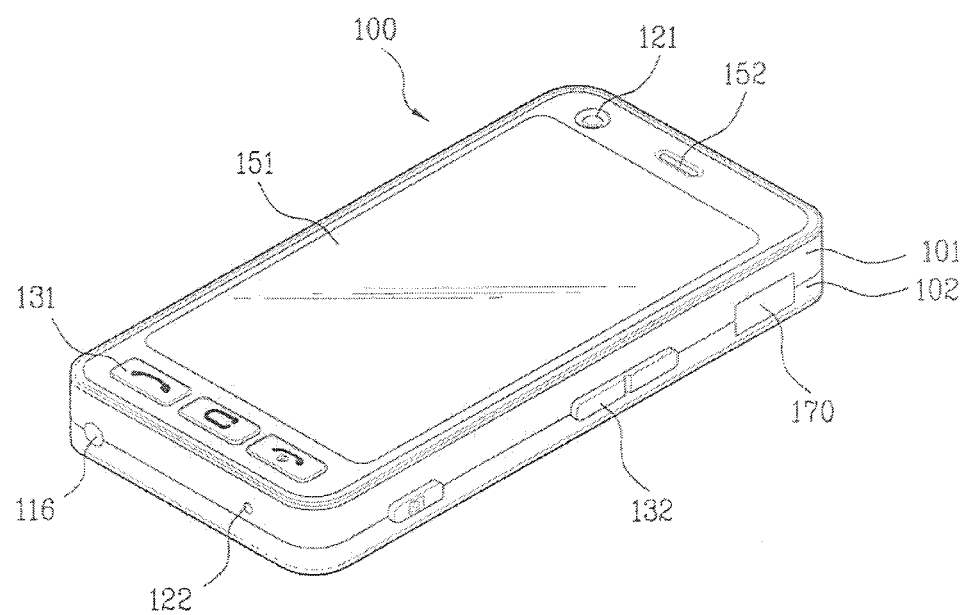
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
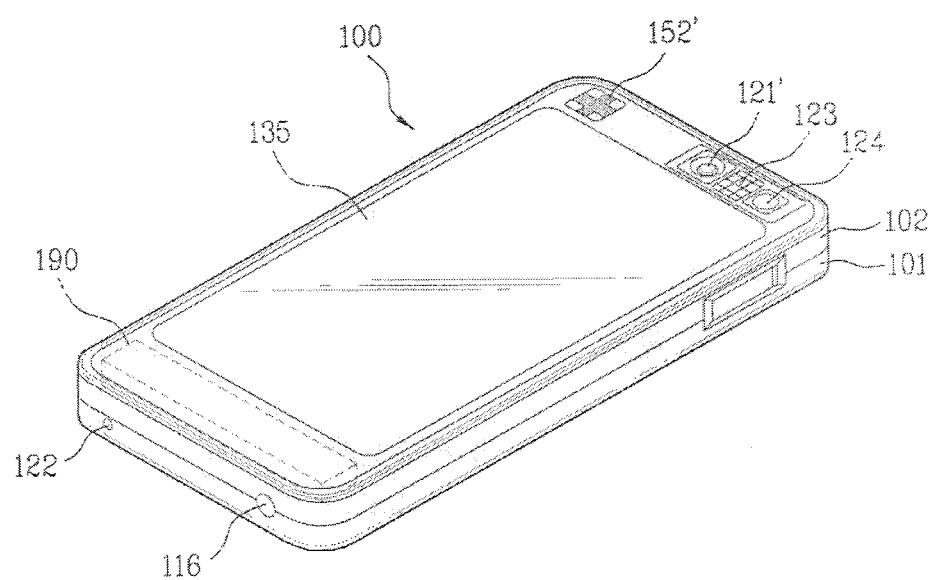
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

Alternatively, a display module can be provided to the rear case 102 without a touchpad (i.e., non-touchscreen). Usages of the display module provided to the rear case shall be explained later.

The touchpad 135 is activated by interconnecting with the display 151 of the front case 101. The touchpad 135 can be provided in rear of the display 151 in parallel. The touchpad 135 can have a size equal to or smaller than that of the display 151.

Figure 2C:
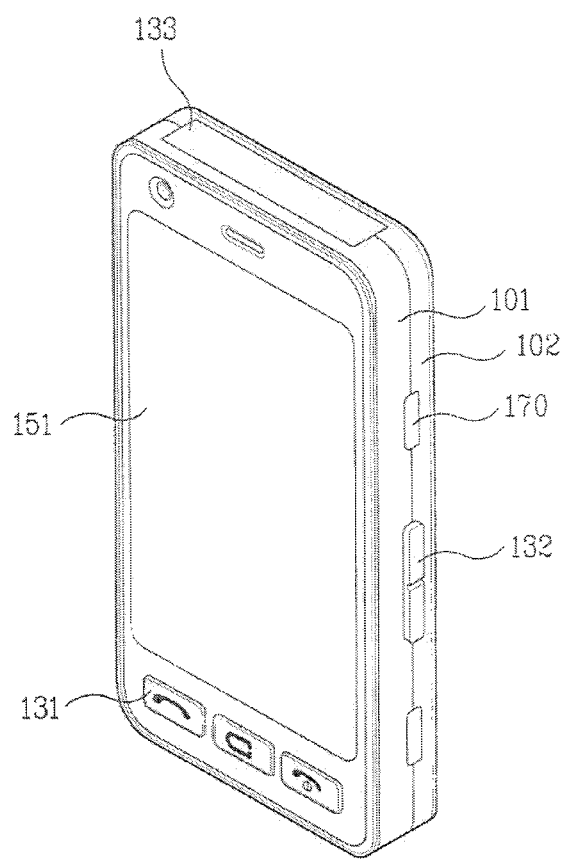
FIGS. 2C to 2E are perspective front or rear diagrams of a mobile terminal according to another embodiment of the present invention.
Figure 2D:
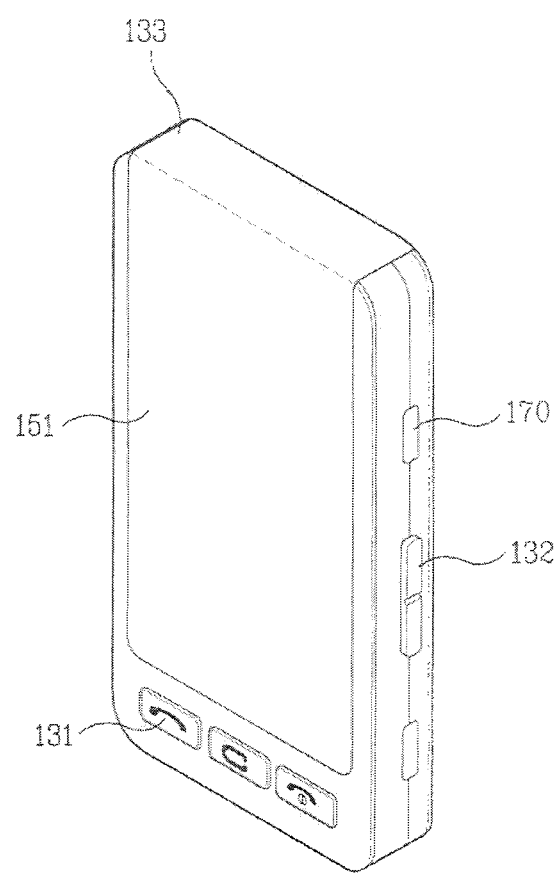
Figure 2E:
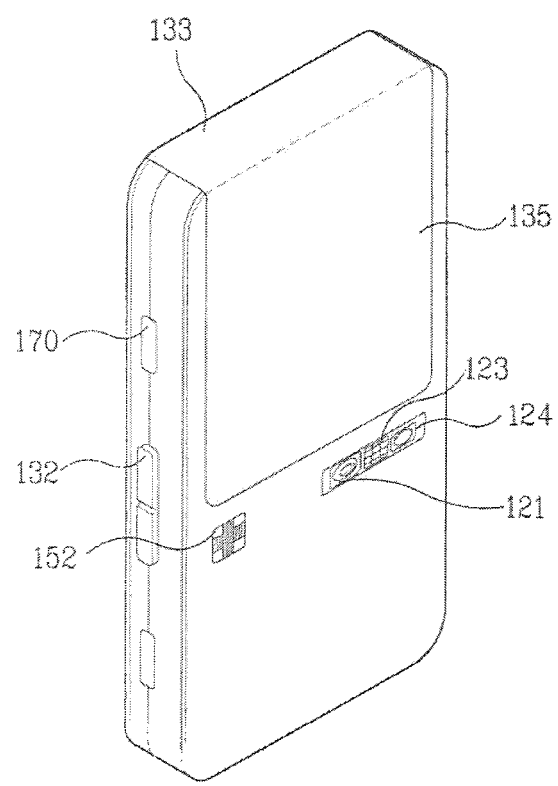

FIGS. 2C to 2E are perspective front or rear diagrams for another example of a mobile or portable terminal according to another embodiment of the present invention.

Referring to FIG. 2C, a display module 133 can be provided to one lateral side (e.g., topside) of the terminal body. In this case, the display module 133 provided to the topside can include a touchscreen. Usages of the topside display module 133 shall be explained later.

Meanwhile, at least two of a display module (hereinafter named 'main display module') provided to the front case of the terminal, a display module (hereinafter named 'first subdisplay module') provided to the topside of the housing of the terminal and a display module (hereinafter named 'second subdisplay module') provided to the rear case of the terminal can be constructed with a single display module panel. In this case, the single display module panel can include a flexible display module.

FIG. 2D and FIG. 2E show an example that all of the main display module, the first subdisplay module and the second subdisplay module are constructed with a single display panel built in one body. Referring to FIG. 2D, the audio output module 152 can be provided within the main display module configured with the flexible display module not to be externally seen.

In the following description, embodiments relating to a controlling method implemented in the mobile terminal are explained with reference to the accompanying drawings.

It would be further facilitated to implement the following embodiment in case that the main display module, the first subdisplay module and the second subdisplay module are constructed with a touchscreen. Therefore, the following description is made on the assumption that those display modules include a touchscreen. In the following description, a display screen (i.e., a main display) of the main display module, a display screen (i.e., a first subdisplay) of the first display module and a display screen (i.e., a second subdisplay) of the second display module shall be indicated by reference numbers 400, 500 and 600, respectively.

Figure 3:
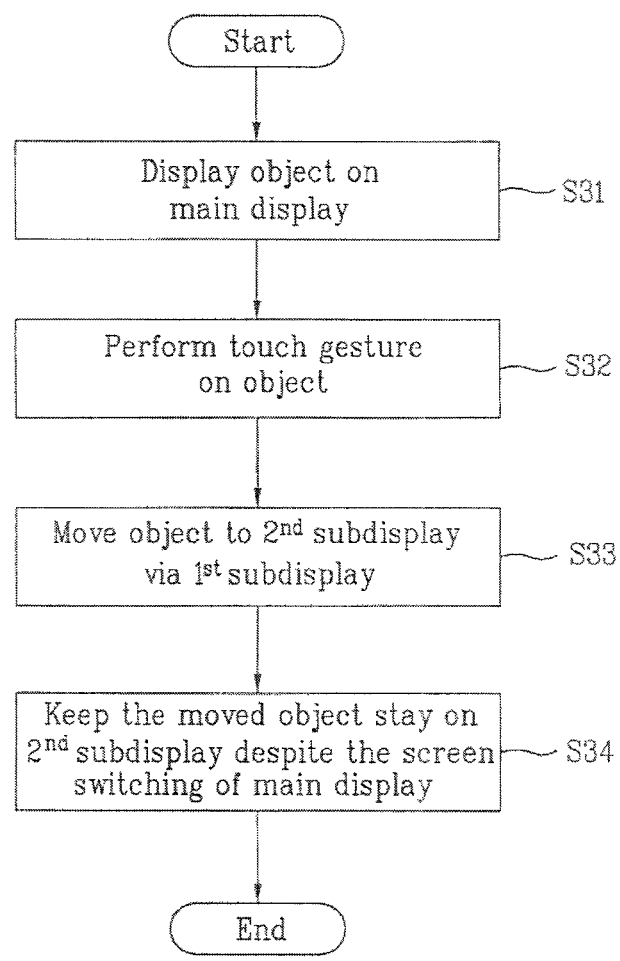
FIG. 3 is a flowchart for a method of controlling a mobile terminal according to an embodiment of the present invention.

FIG. 3 is a flowchart for a method of controlling a mobile terminal according to an embodiment of the present invention, and FIGS. 4 to 11 are diagrams for configurations of a display screen on which a method of controlling a mobile terminal according to an embodiment of the present invention is implemented. FIGS. 4 to 11 schematically show the main display 400, the first subdisplay 500 and the second subdisplay 600.

Referring to (4-1) of FIG. 4, it is able to display at least one or more objects on the main display 400. Each of the objects can include one of an icon (e.g., a file icon, a menu icon, a program execute icon, etc.), a widget, an image, a thumbnail of the image, each item of a list (e.g., a phonebook list, a message list, etc.), each page of an e-book, each webpage of web browser, and the like, by which the present invention is non-limited.

A user command for enabling other objects to be displayed by switching one picture (or screen) to another one on the main display 400 can be inputted via the user input unit 130. In (4-1) of FIG. 4, exemplarily shown is that one picture displayed on the main display 400 is switched to another in a manner of touching the main display 400 with such a pointer as a finger, a stylus pen and the like and then dragging the pointer right to left. In this case, the touch action can include a proximity touch or a contact touch. This is applicable to the following description in the same manner.

If so, referring to (4-2) of FIG. 4, objects differing at least in part from the former displayed objects shown in (4-1) of FIG. 4 are displayed on the main display 400 on which another picture switched from the former picture is displayed.

A touch gesture is performed on a prescribed one 413 of the displayed objects [S32]. Although no limitation is put on the touch gesture, referring to (4-2) of FIG. 4, the touch gesture is performed in a manner of touching the prescribed object 413 and then flicking or dragging the touched object 413 in direction of a first subdisplay.

If so, referring to (4-3) to (4-5) of FIG. 4, the flicked object 413 is shifted from the main display 400 to a second subdisplay 600 via the first subdisplay 500 [S33].

In (4-5) of FIG. 4, shown in the second subdisplay 600 is that a bottom of the shifted object 413 is located toward a topside direction of the terminal (i.e., toward the first subdisplay), by which the present invention is non-limited. Alternatively, referring to (4-6) of FIG. 4, the shifted object 413 can be displayed on the second subdisplay 600 in a manner that a topside of the shifted object 413 is located toward a topside direction (toward the first subdisplay) of the terminal (i.e., in a direction opposite to that shown in (4-5) of FIG. 4.

A shape of the flicked object 413 displayed on the main display 400 needs not to be equal to a shape of the flicked object 413 displayed on the second subdisplay 600. For example, the flicked object 413 is displayed as an image on the main display 400 and can be displayed as a thumbnail of the image on the second display 600.

Referring to (4-5) of FIG. 4, exemplarily shown is that a spot at which the shifted object was located is left vacant on the main display 400, by which the present invention is non-limited. Alternatively, it is able to configure another object to occupy the vacant spot.

The description is ongoing to be made with reference to FIG. 5 as follows.

Figure 5:
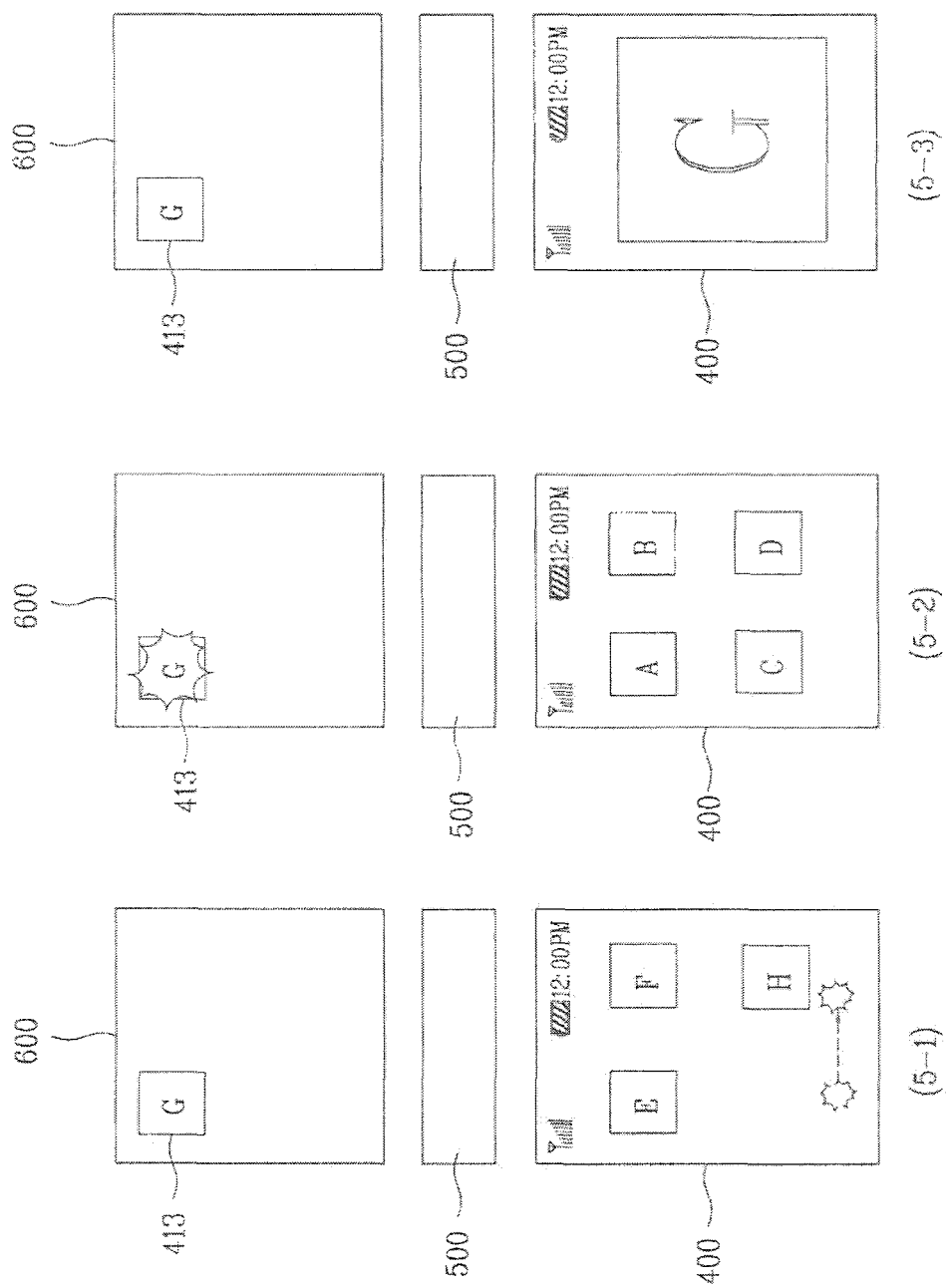

Referring to (5-1) of FIG. 5, a touch & drag is performed on the main display 400 left to right.

If so, referring to (5-2) of FIG. 5, a picture (or screen) switching is performed on the main display 400 so that objects differing at least in part from the former objects shown in (4-2) to (4-6) of FIG. 4 can be displayed on the main display 400. In (5-2) of FIG. 5, exemplarily shown is that the former objects shown in (4-1) of FIG. 4 are displayed again on the main display 400 as a result of the picture switching.

Yet, irrespective of the picture switching of the main display 400, the shifted object 413 keeps being displayed on the second subdisplay 600 [S34].

Therefore, different objects can be displayed on the main display 400 as the picture switching is performed on the main display 400, and thus specific objects can be selected from the different objects and then collected on the second subdisplay 600.

It is able to execute the shifted object 413 on the second subdisplay 600. In (5-2) of FIG. 5, exemplarily shown is that the shifted object 413 is executed by being touched on the second subdisplay 600.

If so, a picture related to the execution of the touched object can be displayed on the main display 400. In case that the touched object relates to a file, the corresponding file is executed or becomes open on the main display 400. In case that the touched object relates to a correspondent party registered with a phonebook list, a picture related to a call connection or message writing to the correspondent party can be displayed on the main display 400.

The description is ongoing to be made with reference to FIG. 6 as follows.

Figure 6:
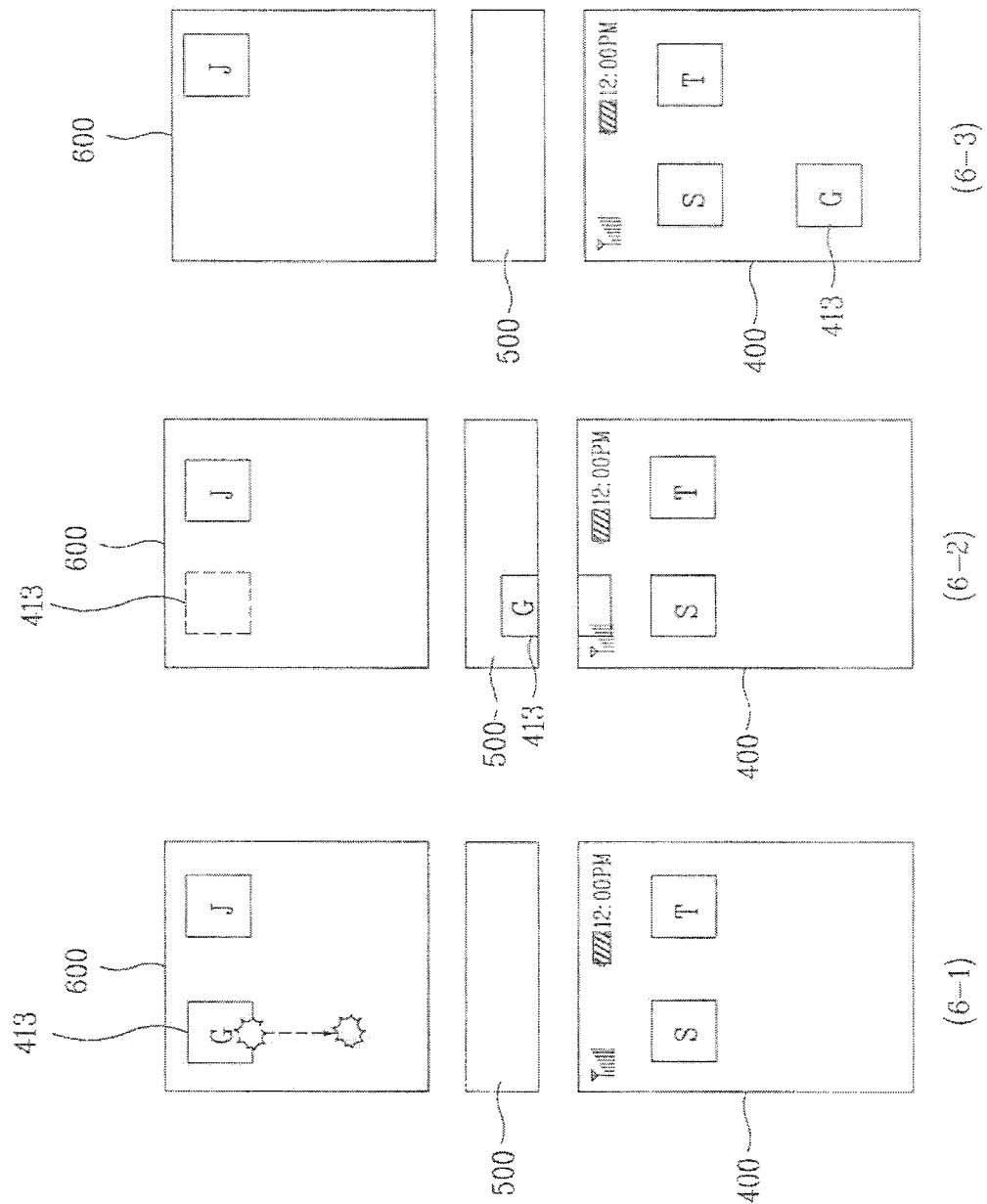

Referring to (6-1) of FIG. 6, two objects are shifted and displayed on the second subdisplay 600 for example.

Subsequently, a prescribed touch gesture is performed on one 413 of the two objects. Although no limitation is put on the touch gesture, referring to (6-1) of FIG. 6, the touch gesture is performed in a manner of touching the object 413 and then flicking or dragging the touched object 413 in direction of the first subdisplay 500.

If so, referring to (6-2) and (6-3) of FIG. 6, the flicked object 413 is shifted from the second display 600 to the main subdisplay 400 via the first subdisplay 500.

If a touch & drag is performed left to right on the main display 400, the shifted object 413 can be no more displayed on the main display 400 [not shown in the drawing].

The description is ongoing to be made with reference to FIG. 7 as follows.

Figure 7:
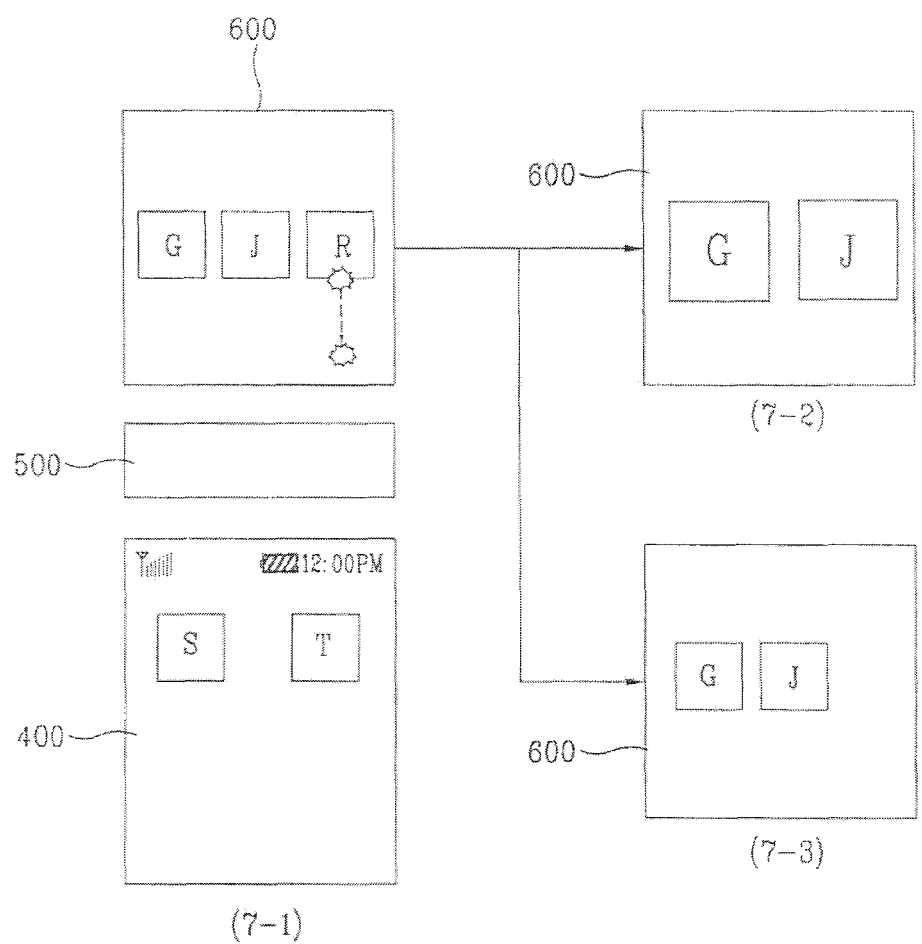

Referring to (7-1) of FIG. 7, three objects are being displayed on the second subdisplay 600.

One of the three objects 400 can be shifted to the main display 400. This is explained in the foregoing description and its details are omitted from the following description for clarity of this disclosure.

If so, two objects remain on the second subdisplay 600.

Referring to (7-2) of FIG. 7, each size of the remaining objects can be inverse-proportional to the number of the objects displayed on the second subdisplay 600. In particular, since the number of the objects on the second subdisplay 600 in (7-2) of FIG. 2 is decremented, sizes of the remaining objects can become greater than those of the former objects on the second subdisplay 600 shown in (7-1) of FIG. 7.

Alternatively, referring to (7-3) of FIG. 7, each size of the remaining objects can remain constant irrespective of the number of the objects on the second subdisplay 600.

The description is ongoing to be made with reference to FIG. 8 as follows.

Figure 8:
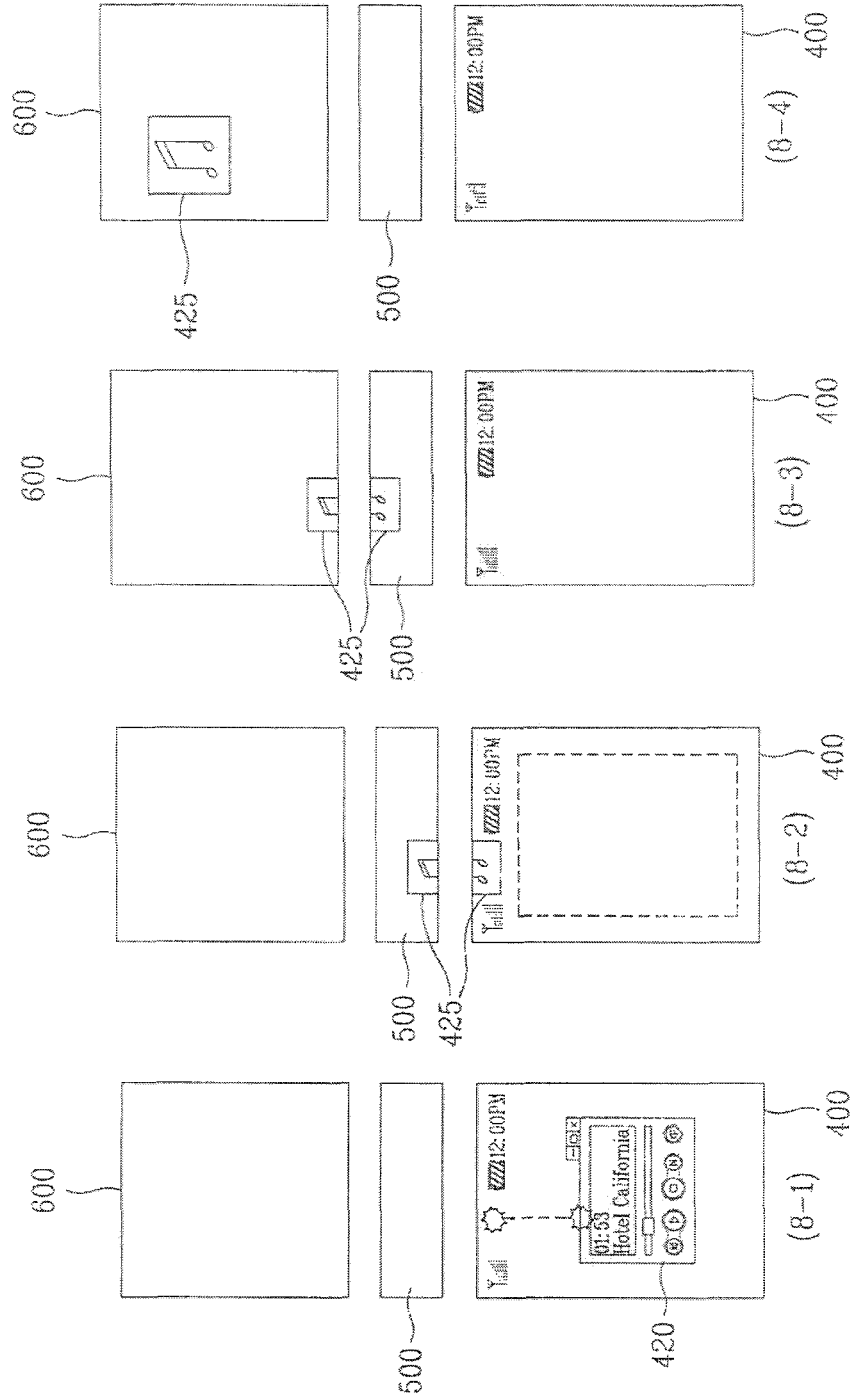

In FIG. 8, assume that such a prescribed function as an audio file play function and the like is being executed in the mobile terminal. In this case, the audio file play function is one example for the prescribed function only and no limitation is put on the prescribed function.

Referring to (8-1) of FIG. 8, an audio file play function window 420 is being displayed on the main display 400.

Subsequently, it is able to perform a prescribed touch gesture on the audio play function window 420. As mentioned in the foregoing description, no limitation is put on the touch gesture. In (8-1) of FIG. 8, exemplarily shown is that the touch gesture includes a touch & flicking toward the first subdisplay 500.

If so, referring to (8-2) of FIG. 8, the playback of an audio file according to the audio play function window is interrupted and the audio play function window 420 disappears from the main display 400.

Subsequently, referring to (8-2) to (8-4) of FIG. 8, an icon 425 of the interrupted audio file is generated from the main display 400 and then moves away into the second subdisplay 600 via the first subdisplay 500. The audio file icon 425 can include execution progress status information of the audio play function at the timing point of interrupting the execution of the audio play function. Alternatively, the execution progress status information is stored in the memory 160 and the audio file icon 425 can be linked to the execution progress status information stored in the memory 160.

For instance, the execution progress status information can include a name of the audio file, which was being played back at the timing point of interrupting the execution of the audio play function, a time of the playback interruption (e.g., 1 minute 53 seconds), and the like. If the execution progress status information is referred to, when the audio file icon 425 is selected to re-execute the audio play function, the corresponding audio file can be played back in a manner of being continuous with the play interrupted timing point. When the audio file icon 425 has been selected, it may disappear from the second subdisplay 600.

The selection of the audio file icon 425 can be made in a manner of touching the audio file icon 425 on the second subdisplay 600 or perform a touch & flicking on the audio file icon 425 toward the first subdisplay 500.

In FIG. 8, exemplarily shown is that the audio file icon 425 is generated from the main display 400 and is then shifted to the second subdisplay 600 via the first subdisplay 500, by which the present invention is non-limited. Alternatively, the audio file icon 425 is generated from the first subdisplay 500 and is then shifted to the second subdisplay 600. Alternatively, the audio file icon 425 can be configured to be directly generated from the second subdisplay 600.

Meanwhile, when the touch gesture is performed, it is not mandatory for the playback of the audio file to be interrupted. Alternatively, when the touch gesture is performed, an audio file icon associated with an audio file name and execution progress status information corresponding to a timing point (e.g., 1 minute 53 seconds) of performing the touch gesture can be displayed on the second subdisplay 600 without interrupting the playback of the audio file while the audio play function window 420 keeps being maintained. Namely, the audio file icon can play a role as a bookmark for the audio file.

The description is ongoing to be made with reference to FIG. 9 and FIG. 10 as follows.

Figure 9:
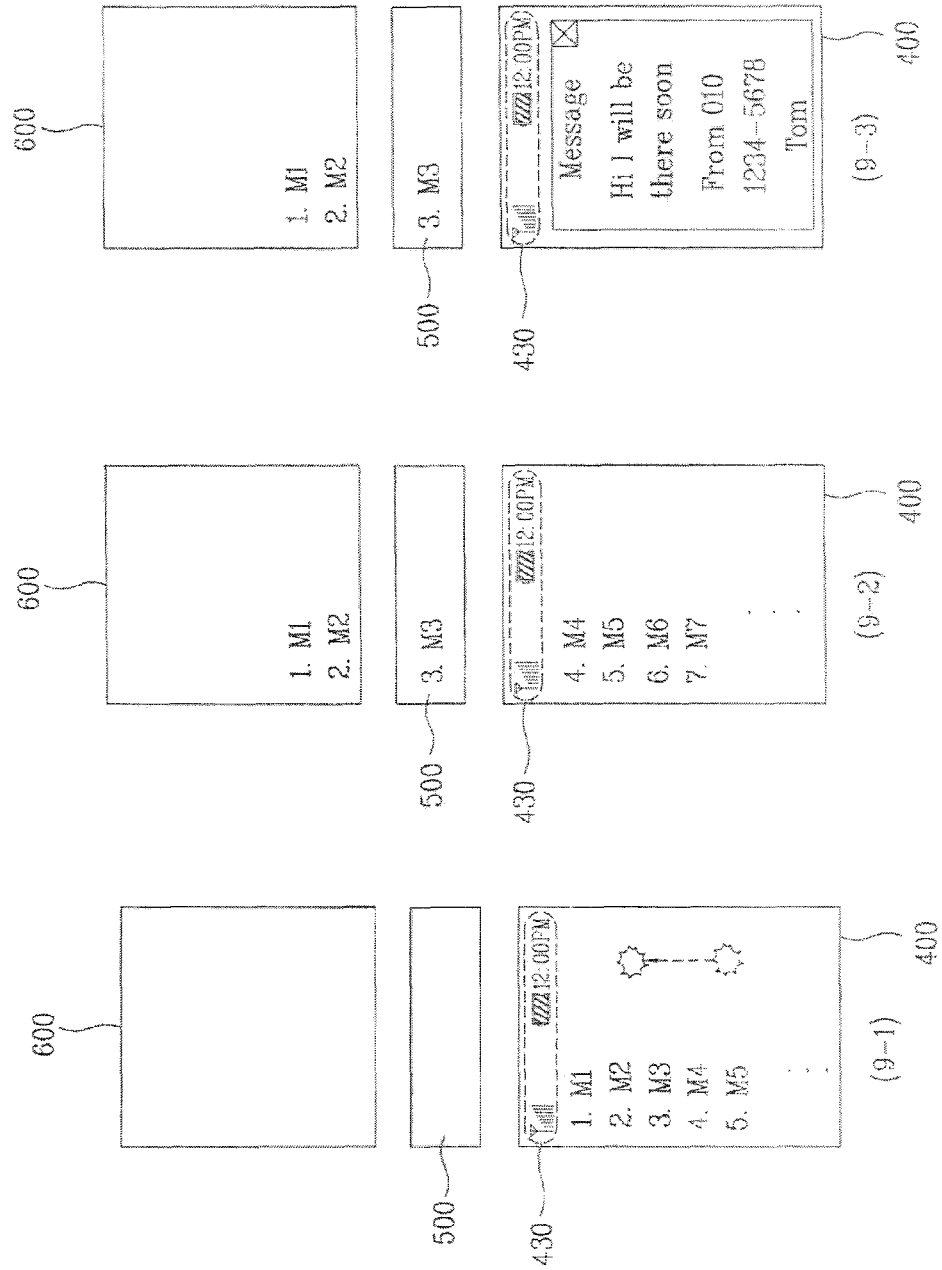

Referring to (9-1) of FIG. 9, a list scrollable up and down can be displayed on the main display 400. No limitation is put on the list. For instance, the list can include one of a message list, a phonebook list, a file list, a menu list and the like. For clarity, the following description is made on the assumption that the list includes the message list.

An indicator bar 430 configured to have various indicators located therein can be displayed on the main display 400. For example, the indicators include a reception strength indicator, a battery indicator, a clock indicator and the like, by which the present invention is non-limited.

First of all, a touch & drag is performed bottom to top on the main display 400.

If so, referring to (9-2) of FIG. 9, the list is scrolled bottom to top in proportion to a length of the touch & drag. In this case, the scrolled list can be shifted to the first subdisplay 500 and the second subdisplay 600. In particular, when the list is scrolled, the scrolled list can move away into the second subdisplay 600 via the first subdisplay 500. If the list keeps being scrolled to reach one end of the second subdisplay 600, an item of the list having reached the one end of the second subdisplay 600 can disappear [not shown in the drawing].

If one message is selected from the list, referring to (9-3) of FIG. 9, a content of the selected message can be displayed on the main display 400. In this case, the selection for the message can be made in a manner that the message is touched for example.

FIG. 9 shows that the indicator bar 430 remains still when the list is being scrolled. Yet, when the list is being scrolled, it is not mandatory for the indicator bar 430 to remain still.

Figure 10:
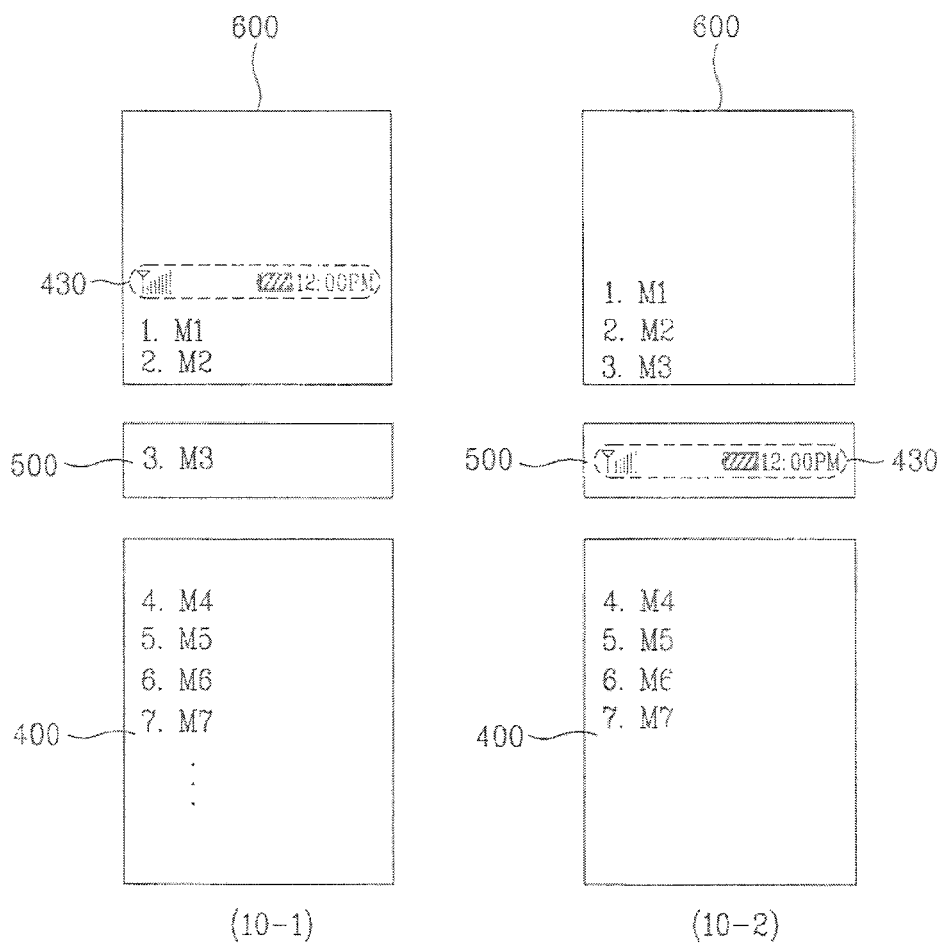

Referring to (10-1) of FIG. 10, when the list is being scrolled, the indicator bar 430 can be simultaneously scrolled into the second subdisplay 600 via the first subdisplay 500. If the list keeps being scrolled to reach one end of the second subdisplay 600, the indicator bar 430 can disappear [not shown in the drawing]. Alternatively, despite the ongoing scroll of the list, once the indicator bar 430 reaches one end of the second subdisplay 600, it may remain still at the reached one end without moving farther.

Alternatively, referring to (10-2) of FIG. 10, when the list is being scrolled, the indicator bar 430 is shifted to and displayed on the first subdisplay 500 and the list can be directly scrolled to the second subdisplay 600 from the main display 400.

The description is ongoing to be made with reference to FIG. 11 as follows.

Figure 11:
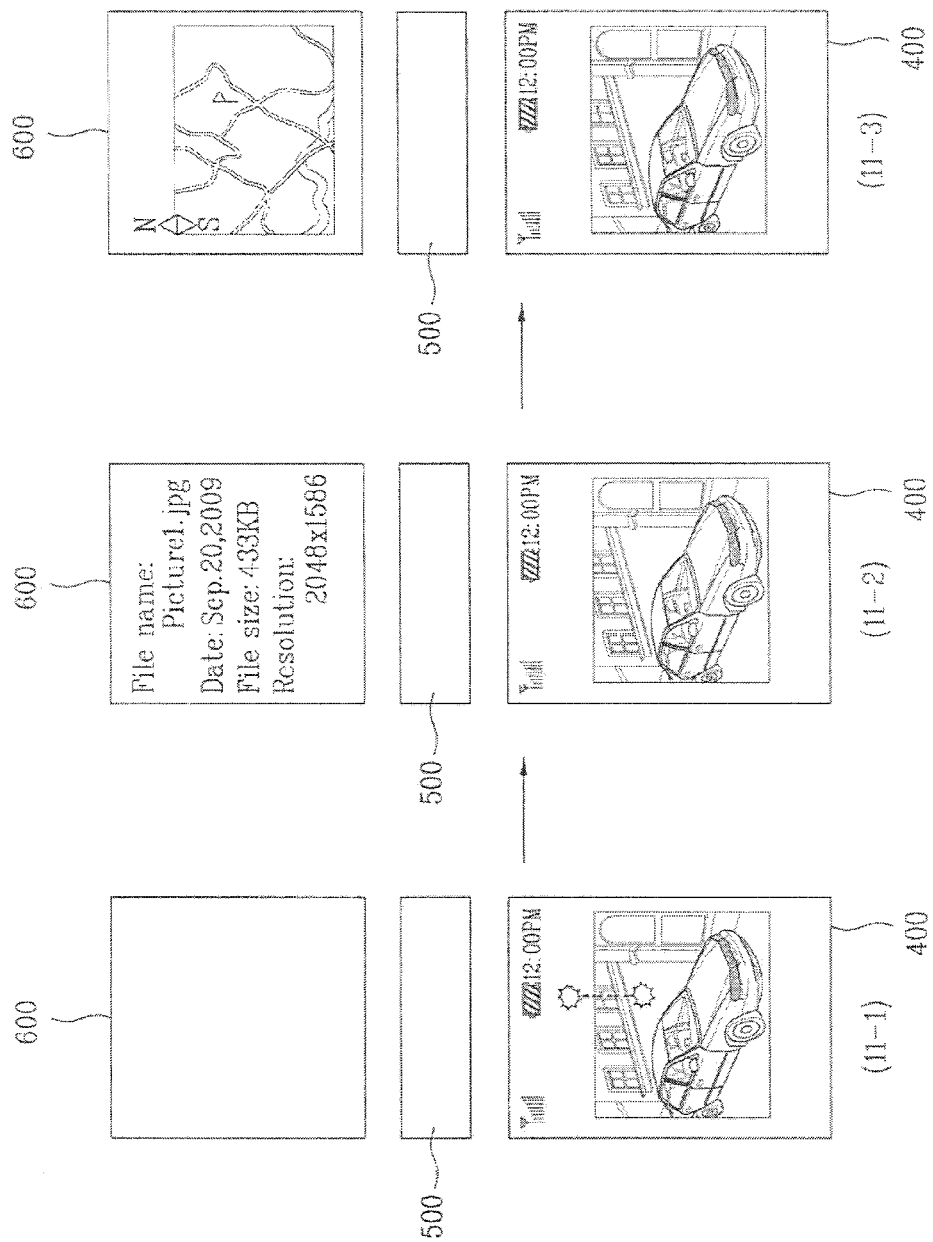

Referring to (11-1) of FIG. 11, an image (e.g., still picture or moving picture) of a multimedia file is being displayed on the main display 400.

In doing so, the aforesaid touch gesture can be performed on the image.

If so, referring to (11-2) of FIG. 11, first information of the multimedia file can be displayed on the second subdisplay 600. For instance, the first information can include a file name, a file size, resolution and the like, by which the present invention is non-limited.

A terminal user shakes the mobile terminal 100 or can rotate the mobile terminal 100 in a prescribed direction.

If so, a motion of the mobile terminal 100 (i.e., a motion of the terminal housing) can be detected by the sensing unit 140.

According to the detected motion, the controller 180 is able to control the second subdisplay 600 to display second information of the multimedia file. For instance, the second information can include map information on a location where the image of the multimedia file was photographed. In this case, the map information is stored in the memory unit 160 or can be received from an external server via the wireless communication unit 110.

FIG. 11 exemplarily shows that the first and second informations of the multimedia file are displayed on the second subdisplay 600. Alternatively, the first and second informations can be displayed on the first subdisplay 500.

In the following description, a controlling method implemented in the mobile terminal according to an embodiment of the present invention is explained with reference to FIG. 12 and FIG. 13.

Figure 12:
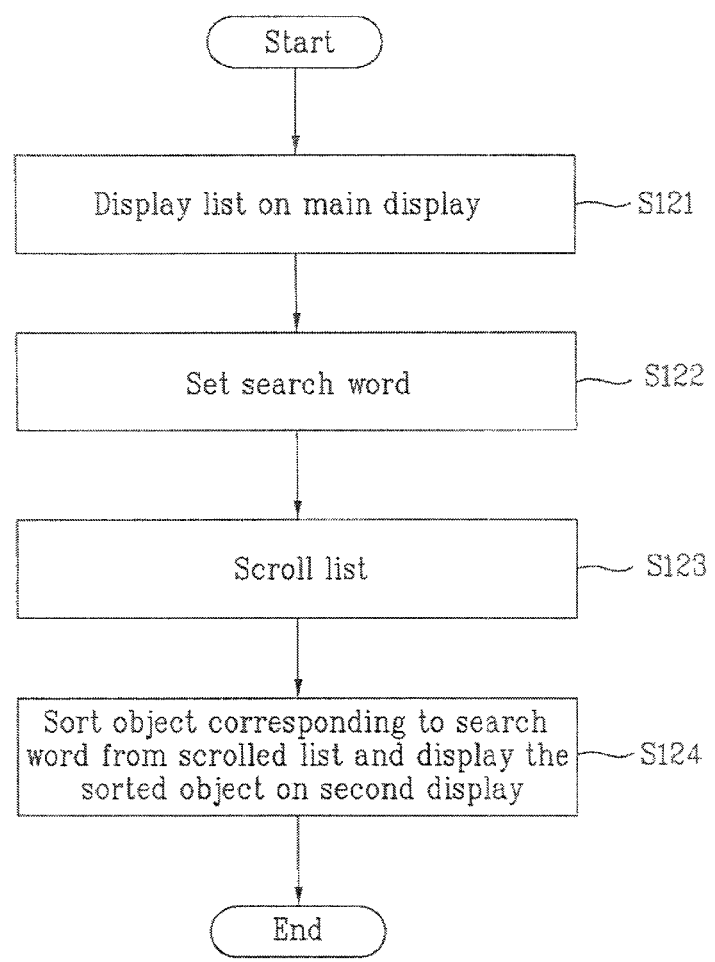
FIG. 12 is a flowchart for a method of controlling a mobile terminal according to an embodiment of the present invention.
Figure 13:
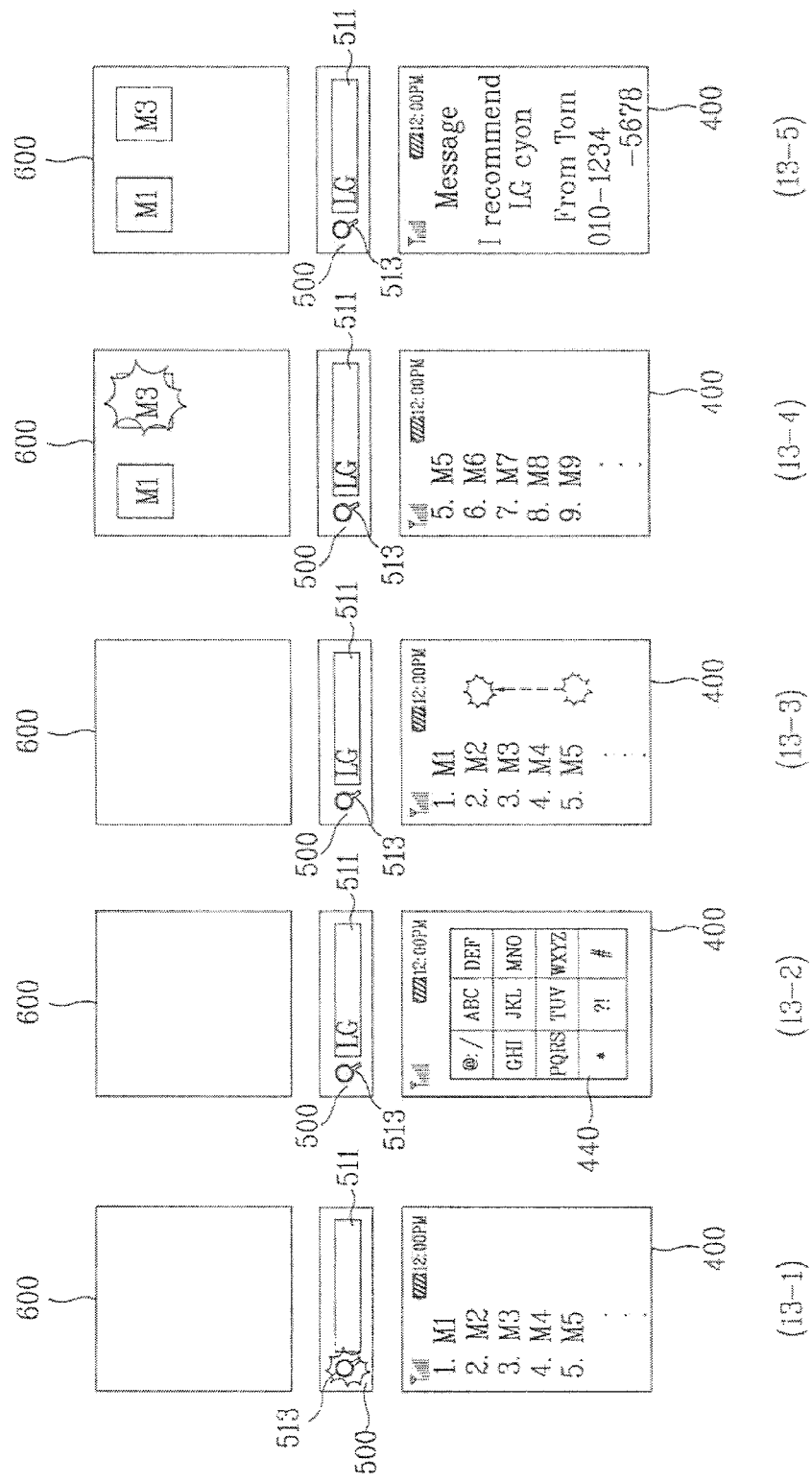
FIG. 13 is a diagram for configurations of a display screen on which a method of controlling a mobile terminal according to an embodiment of the present invention is implemented.

FIG. 12 is a flowchart for a method of controlling a mobile terminal according to an embodiment of the present invention, and FIG. 13 is a diagram for configurations of a display screen on which a method of controlling a mobile terminal according to an embodiment of the present invention is implemented. In particular, FIG. 13 schematically illustrates the main display 400, the first subdisplay 500 and the second subdisplay 600.

Referring to (13-1) of FIG. 13, a list is being displayed on the main display [S121]. As mentioned in the foregoing description, no limitation is put on the list. For instance, the list can include one of a message list, a phonebook list, a file list, a menu list and the like, by which the present invention is non-limited. For clarity, the following description is made on the assumption that the list includes the message list.

First of all, a command for searching the list for an object (i.e., item) can be inputted via the user input unit 130, of which details shall be omitted from the following description for clarity because it is apparent to those skilled in the art that the search command can be inputted through an appropriate manipulation of the user input unit 130.

If so, a search word input box 511 and a search word input icon 513 can be displayed on the first subdisplay 500. It is not mandatory for the search word input box 511 and the search word input icon 513 to be displayed on the first subdisplay 500. Alternatively, the search word input box 511 and the search word input icon 513 can be displayed on the main display 400.

It is not mandatory for the search word input box 511 and the search word input icon 513 to exist separately. Alternatively, it is able to configure the search word input box 511 to play a role as the search word input icon 513 as well.

Subsequently, the search word input icon 513 is touched.

If so, referring to (13-2) of FIG. 13, a search word input to the search word input box 511 is ready and a soft keypad 440 for a text input is displayed on the main display 400.

In case that the user input unit 130 of the mobile terminal 100 includes a keypad for a text input, the soft keypad 440 may not be displayed.

If a search word is inputted via the soft keypad 440, the inputted search word can be displayed in the search word input box 511.

No limitation is put on the search word. For instance, if the object is a music file, a corresponding music singer or genre can be included in the search word. Alternatively, if the object is a photo file, a photograph date, a photograph location, a photo title and/or the like can be included in the search word.

If the search word input icon 513 is touched one more time, referring to (13-3) of FIG. 13, the search word input is completed as soon as the soft keypad 440 disappears. In this case, the search word conceptionally includes search alphabets and search vocabulary.

Subsequently, referring to (13-3) of FIG. 13, a touch & drag having a prescribed length is performed bottom to top on the main display 400 [S123].

If so, referring to (13-4) of FIG. 13, the list is scrolled in a distance amounting to the length of the touch & drag.

As the list is scrolled, messages M1 to M4 in the list disappearing from the main display 400 are sequentially compared with the search word by being synchronized with a scrolled speed of the list.

According to the comparison with the search word, the messages M1 and M3 corresponding to the search word among the disappearing messages M1 to M4 are sorted out and then displayed on the second subdisplay 600 in order [S124].

In particular, as the list is scrolled, one message (e.g., the message M1) is compared with the search word the moment the message M1 disappears from the main display 400. If the message M1 corresponds to the search word, it is sorted and displayed on the second subdisplay 600 as soon as it disappears from the main display 400. If the message M1 does not correspond to the search word, it just disappears from the main display 400 in direct.

After the message M1 disappears, at the moment a next message (e.g., the message M2) disappears from the main display 400 according to the scroll of the list, the next message M2 is compared with the search word. And, subsequent procedures are executed in the aforesaid manner.

Therefore, if a speed of the touch & drag is high, the list is scrolled fast to quickly sort out the scrolled messages in the list. If a speed of the touch & drag is low, the list is scrolled slowly to sort out the scrolled messages in the list slowly.

When the message is sorted on the second subdisplay 600 by corresponding to the search word, a visual effect for indicating the message sorting can be generated from at least one of the main display 400, the first subdisplay 500 and the second subdisplay 600 or a corresponding sound effect or vibration can be generated as well. At least one of the visual effect, the sound effect or the vibration can be generated each time one message is sorted out.

Subsequently, one of the messages, which are sorted and displayed on the second subdisplay 600, is touched and selected.

If so, referring to (13-5) of FIG. 13, a content of the selected message is displayed on the main display 400.

In the above description so far, after a touch & drag has been performed on the main display 400, the number of messages in proportion to the touch & drag are sorted out by being compared with the search word in a manner of disappearing from the main display 400 sequentially, by which the present invention is non-limited. Alternatively, according to the present embodiment, when a touch & drag is performed on the main display 400, all messages can be sorted out by being compared with the search word in a manner of sequentially disappearing from the main display 400.

A controlling method implemented in the mobile terminal according to an embodiment of the present invention is explained with reference to FIGS. 14 to 22 as follows.

Figure 14:
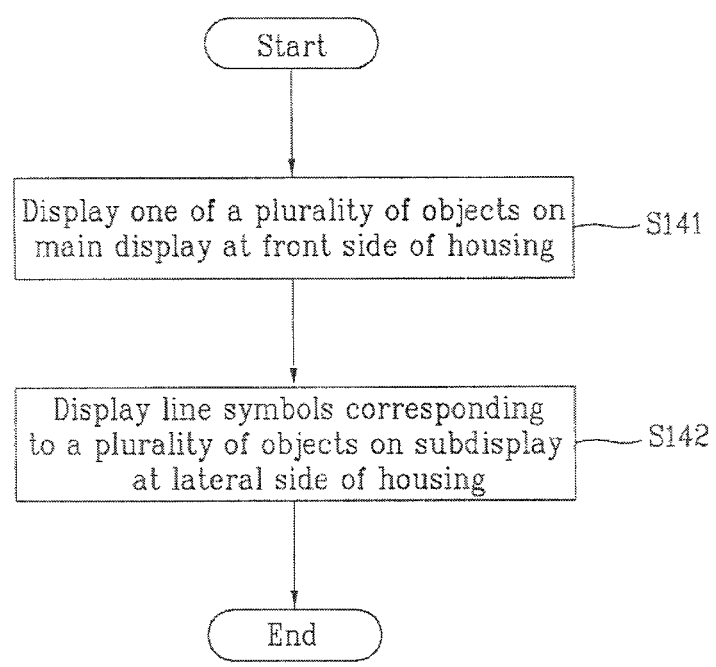
FIG. 14 is a flowchart for a method of controlling a mobile terminal according to an embodiment of the present invention.

FIG. 14 is a flowchart for a method of controlling a mobile terminal according to an embodiment of the present invention, and FIGS. 15 to 22 are diagrams for configurations of a display screen on which a method of controlling a mobile terminal according to an embodiment of the present invention is implemented.

In particular, FIGS. 15 to 22 schematically illustrate the main display 400, the first subdisplay 500 and the second subdisplay 600.

Figure 15:
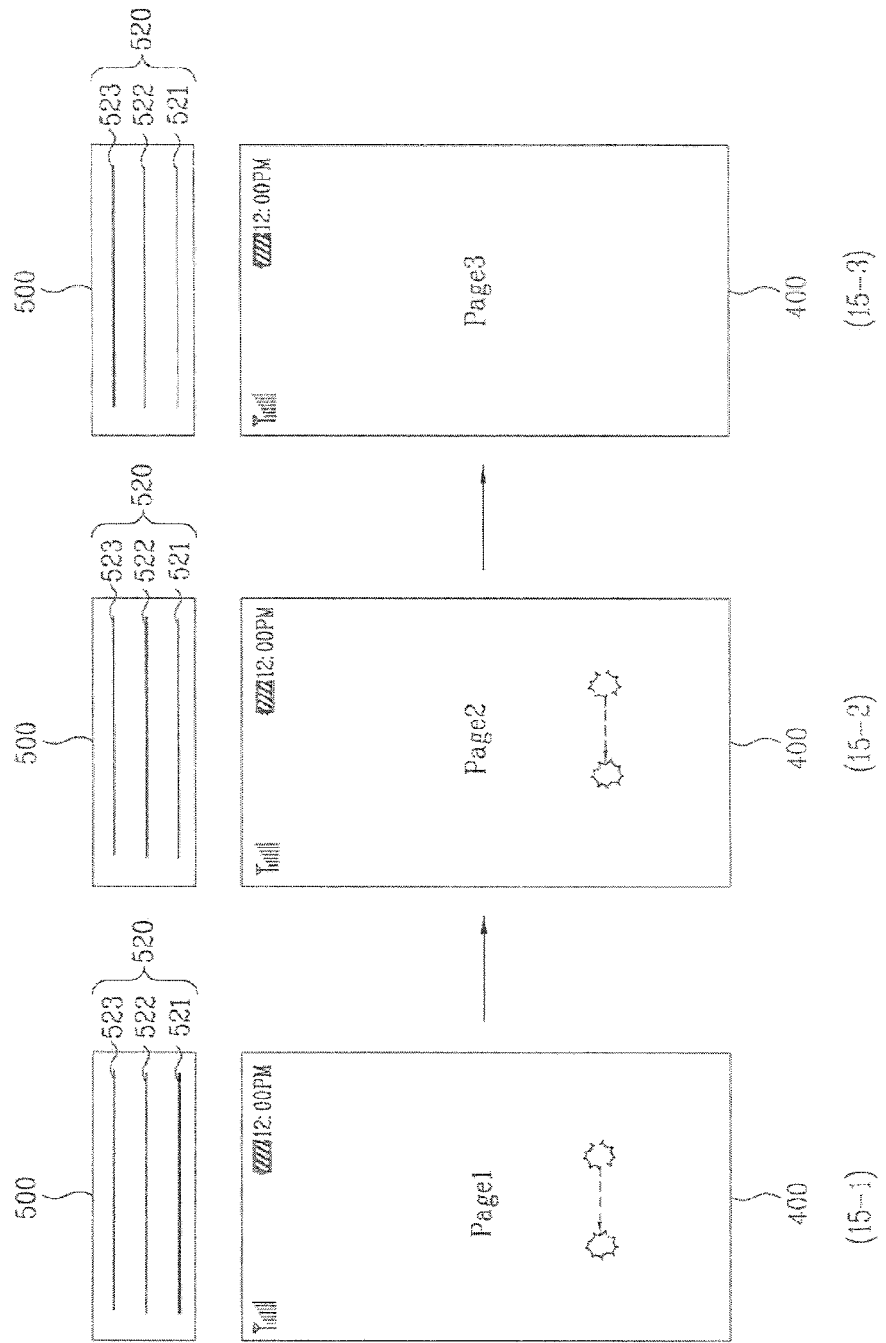

Referring to (15-1) of FIG. 15, one of a plurality of objects is being displayed on the main display 400 [S141]. In this case, the object can include one of an image of a photo album, each content of a message list, each page of an e-book, each webpage of a web browser and the like, by which the present invention is non-limited. For clarity, in the following description, assume that the object includes each page of an e-book.

First of all, line symbols 520 corresponding to pages of an e-book are displayed on the first subdisplay 500 [S142]. Each of the line symbols 520 are configured in form of a line. And, the line symbols 520 can be displayed in parallel with each other in length direction. For clarity of illustration of FIG. 15, assume that the e-book includes 3 pages. And, assume that three line symbols 520, i.e., first to third line symbols 521 to 523 are displayed on the first subdisplay 500.

Particularly, the line symbols 520 are able to bring such an effect as if each page is viewed as one line in viewing a real book from above.

In (15-1) of FIG. 15, exemplarily shown is that a first page of the e-book is displayed on the main display 400.

Therefore, the first line symbol 521 corresponding to the first page can be displayed on the first subdisplay 500 in a manner of being visually discriminated from other line symbols 522 and 523.

In (15-1) of FIG. 15, exemplarily shown is that the first line symbol 521 is visually discriminated from other line symbols 522 and 523 in a manner of being displayed bolder than each of the line symbols 522 and 523. Alternatively, the first line symbol 521 can be visually discriminated from other line symbols 522 and 523 in a manner that a prescribed indicator is provided to the first line symbols 521 [not shown in the drawing].

Referring to (15-2) of FIG. 15, the e-book can be turned over to a second page from a first page on the main display 400. In particular, the second page of the e-book is displayed on the main display 400. And, no limitation is put on the manipulation of the user input unit 130 to turn over pages of the e-book. In (15-1) and (15-2) of FIG. 15, exemplarily shown is that the page turn-over is performed in a manner of performing a touch & drag right to left on the main display 400.

As the second page of the e-book is displayed on the main display 400, the second line symbol 522 corresponding to the second page can be displayed on the first subdisplay 500 in a manner of being visually discriminated from other line symbols 521 and 523.

Referring to (15-3) of FIG. 15, the pages of the e-book can be turned over to the third page from the second page on the main display 400. In particular, the third page of the e-book is displayed on the main display 400.

As the third page of the e-book is displayed on the main display 400, the third line symbol 523 corresponding to the third page can be displayed on the first subdisplay 500 in a manner of being visually discriminated from other line symbols 521 and 522.

Figure 16:
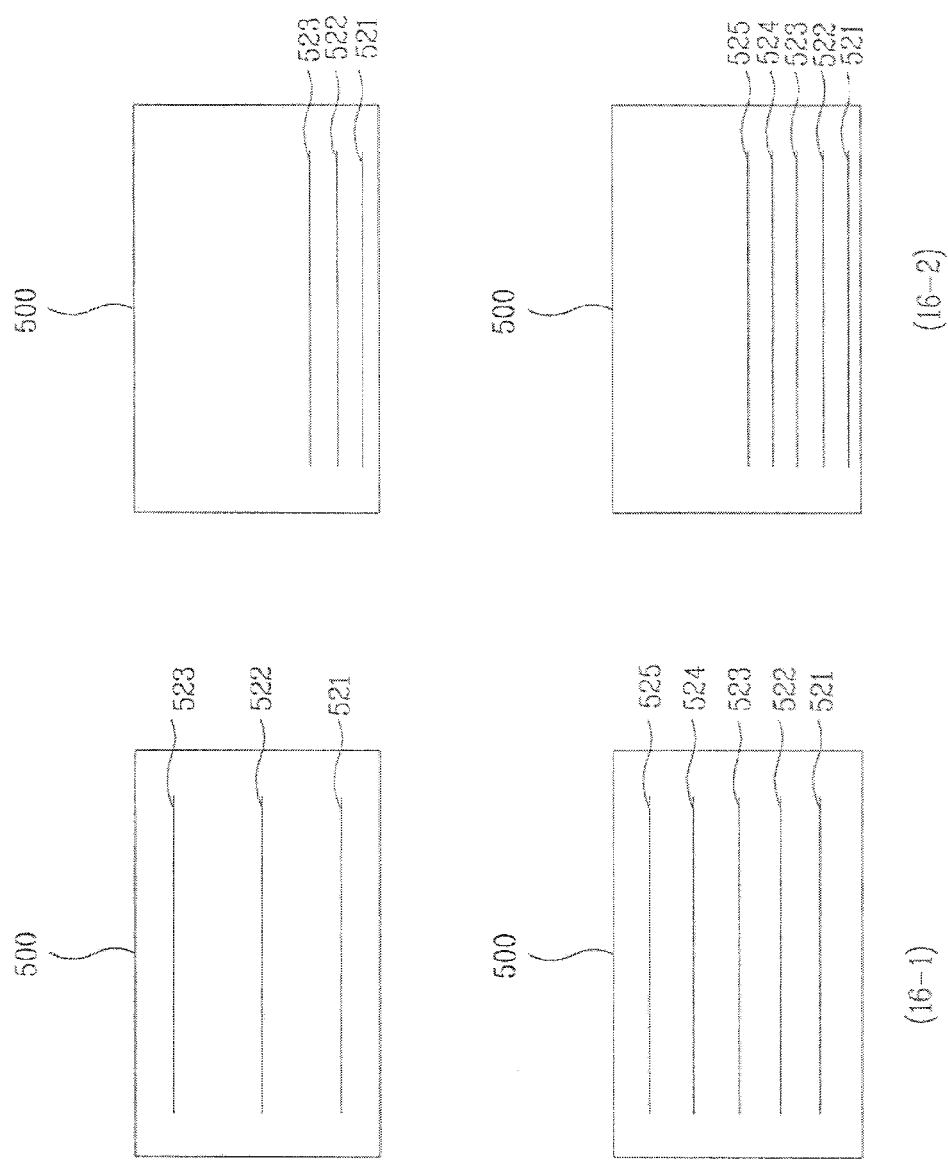

The following description is made with reference to FIG. 16.

Referring to (16-1) of FIG. 16, line symbols displayed on the first subdisplay 500 can be displayed in a manner that an inter-line symbol space is inverse proportional to the number of line symbols displayed on the first subdisplay 500. In this case, a terminal user is able guess the total number of pages of the e-book in consideration of space density between the line symbols.

Alternatively, referring to (16-2) of FIG. 16, line symbols displayed on the first subdisplay 500 can be displayed in a manner that an inter-line symbol space is set uniform irrespective of the number of line symbols displayed on the first subdisplay 500. In this case, a terminal user is able to guess the total number of pages of the e-book in consideration of total thickness of the line symbols.

Figure 17:
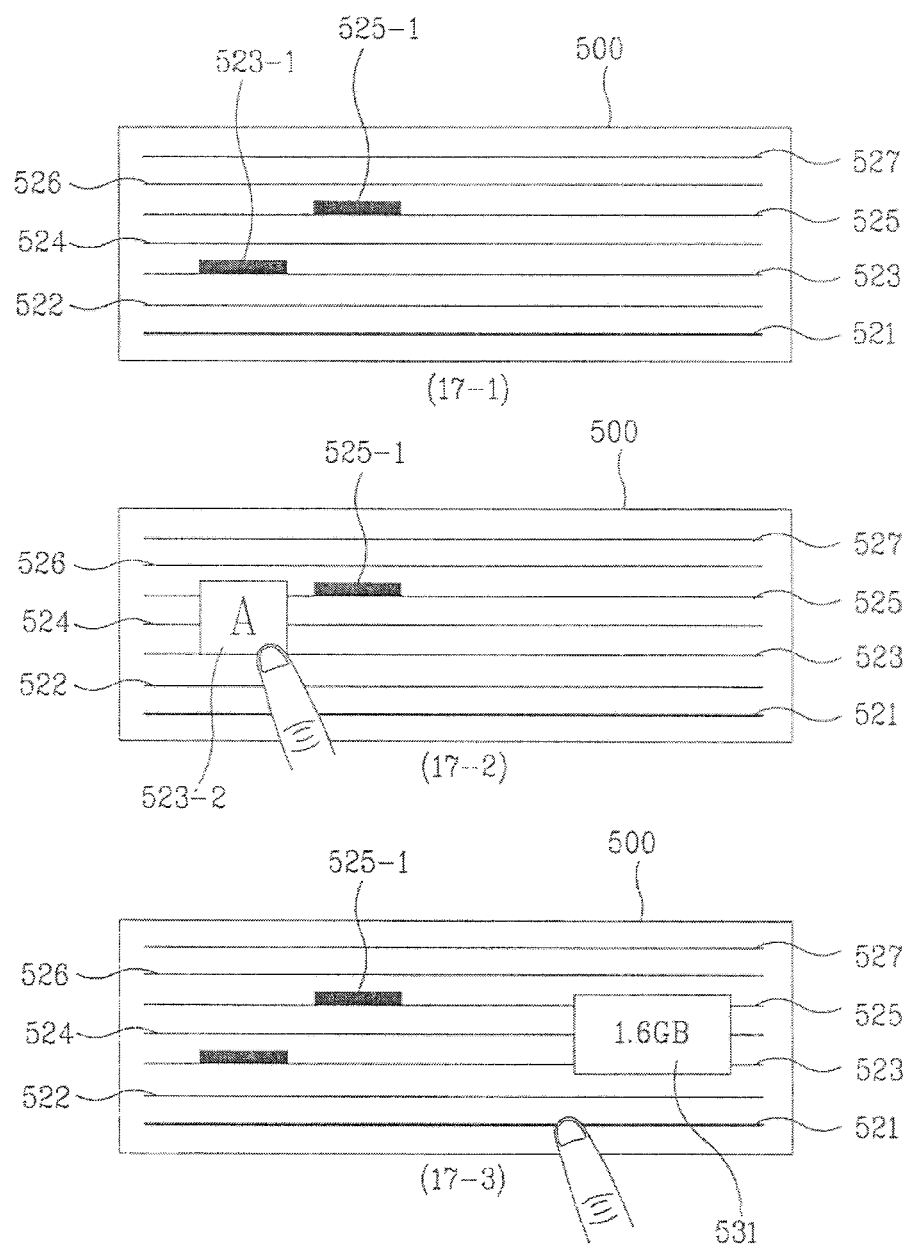

The following description is made with reference to FIG. 17.

Referring to (17-1) of FIG. 17, $1^{st}$ to $7^{th}$ line symbols 521 to 527 are exemplarily displayed on the first subdisplay 500.

Bookmark indicators 523-1 and 625-1 can be displayed on some (i.e., the $3^{rd}$ and $5^{th}$ line symbols 523 and 525) of the line symbols corresponding to previously bookmarked pages of the e-book, respectively.

Referring to (17-2) of FIG. 17, a touch is performed on the first subdisplay 500. If so, an index information indicator 523-2 of the $3^{rd}$ line symbol 523 corresponding to the touch can be displayed on the first subdisplay 500. No limitation is put on the index information 523-2. The index information can include information on a category (e.g., chapter) to which a page corresponding to the $3^{rd}$ line symbol belongs. The index information can be displayed for the entire line symbols or can be displayed for the line symbols corresponding to the bookmarked pages only.

Referring to (17-3) of FIG. 17, when a touch is performed on the first subdisplay 500, remaining memory capacity (or space) information related to the e-book can be displayed thereon.

Figure 18:
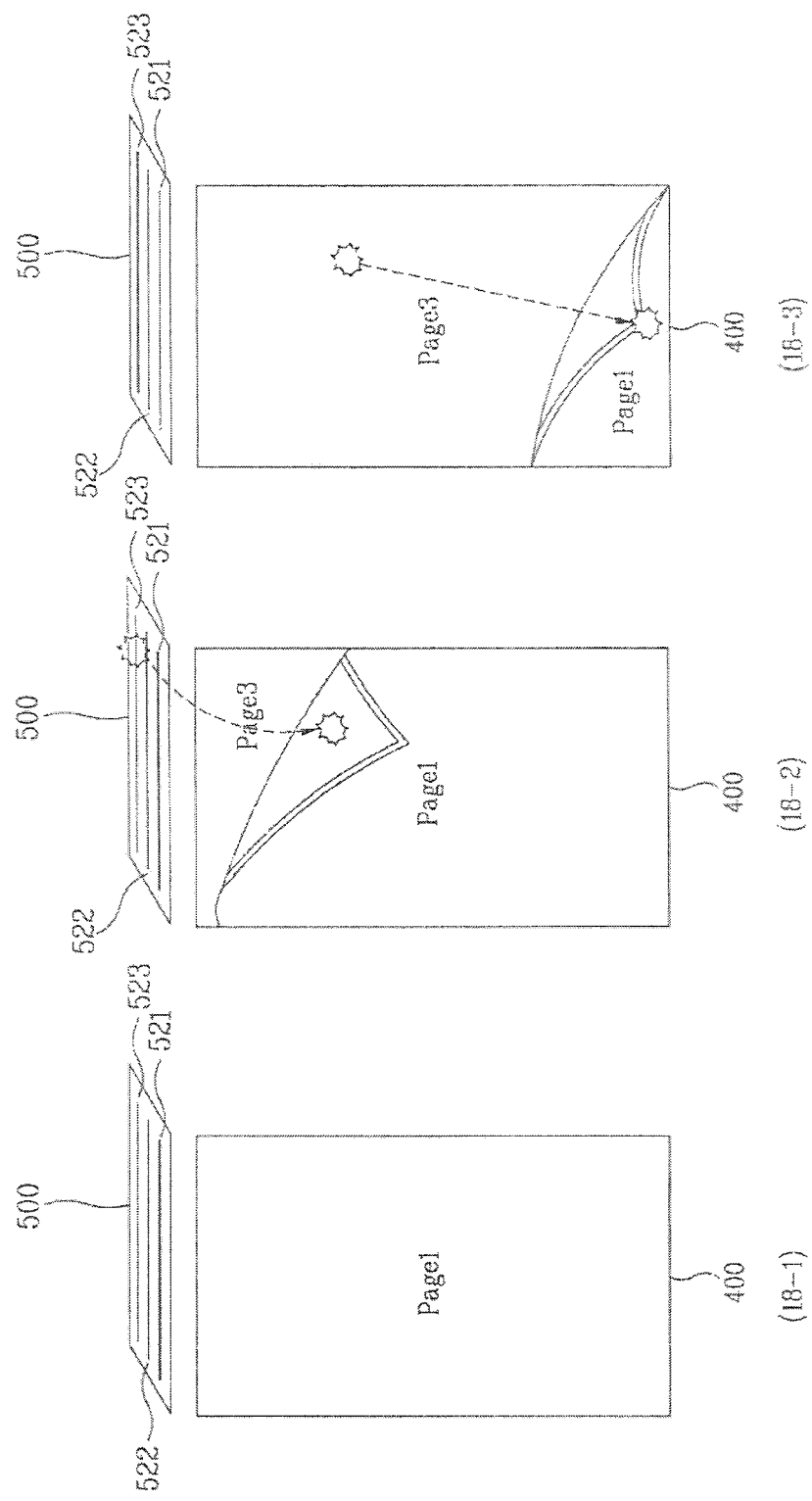

The following description is made with reference to FIG. 18.

In FIGS. 18 to 22, assume that the mobile terminal is executing an e-book having three pages for example.

Referring to (18-1) of FIG. 18, a first page of the e-book is being displayed on the main display 400. And, $1^{st}$ to $3^{rd}$ line symbols 521 to 523 corresponding to the three pages are being displayed on the first subdisplay 500 for example.

Referring to (18-1) to (18-3) of FIG. 18, after the first subdisplay 500 has been touched with a pointer, the pointer is dragged to the main display 400 in bottom direction.

As the pointer is dragged, a top part of the first page disappears in a manner of flipping away as soon as another page corresponding to the line symbol (e.g., $3^{rd}$ line symbol 523) corresponding to the first touch of the pointer starts to be displayed at the disappearing spot.

If the touch is released before the drag reaches a prescribed distance, the first page is cancelled to be turned over. After the release of the touch, the displayed third page becomes covered with the first page again over a prescribed period of time. In particular, the first page is completely re-displayed on the main display 400 after the prescribed period of time and the third page stops being displayed no more.

Yet, if the touch is released after the drag has reached the prescribed distance, the first page is completely turned over and the third page keeps being displayed on the main display 400.

Figure 19:
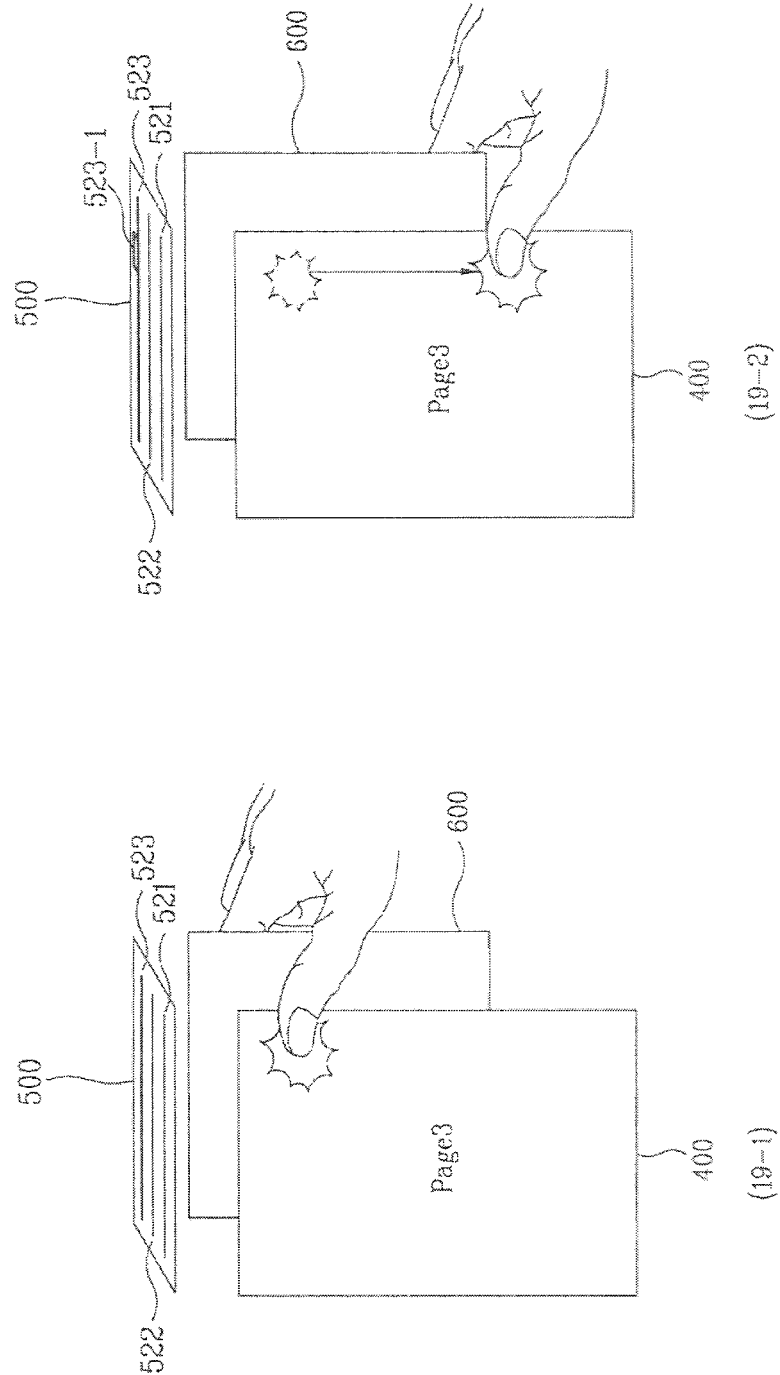

The following description is made with reference to FIG. 19.

Referring to (19-1) of FIG. 19, the third page of the e-book is being displayed on the main display 400 and $1^{st}$ to $3^{rd}$ line symbols 521 to 523 corresponding to the three pages respectively are being displayed on the first subdisplay 500.

Referring to (19-1) and (19-2) of FIG. 19, after the main display 400 and the second subdisplay 600 have been simultaneously touched, a drag is performed in top-to-bottom direction.

If so, the controller 180 is able to control a bookmark to be set at the third page which is being currently displayed on the main display 400.

Once the bookmark is set at the third page, referring to (19-2) of FIG. 19, a bookmark indicator 523-1 can be generated from the $3^{rd}$ line symbol 523 corresponding to the third page.

After the bookmark has been set at the third page, a touch is simultaneously performed on both of the main display 400 and the second subdisplay 600 and a drag can be then performed in bottom-to-top direction, while the third page is being displayed on the main display 400 [not shown in the drawing]. If so, the bookmark setting of the third page is released and the bookmark indicator 523-1 can disappear from the third line symbol 523.

As the bookmark is set and then released, the bookmark indicator 523-1 is generated from the $3^{rd}$ line symbol 523 and then disappears. This is further explained with reference to FIG. 20 as follows.

Figure 20:
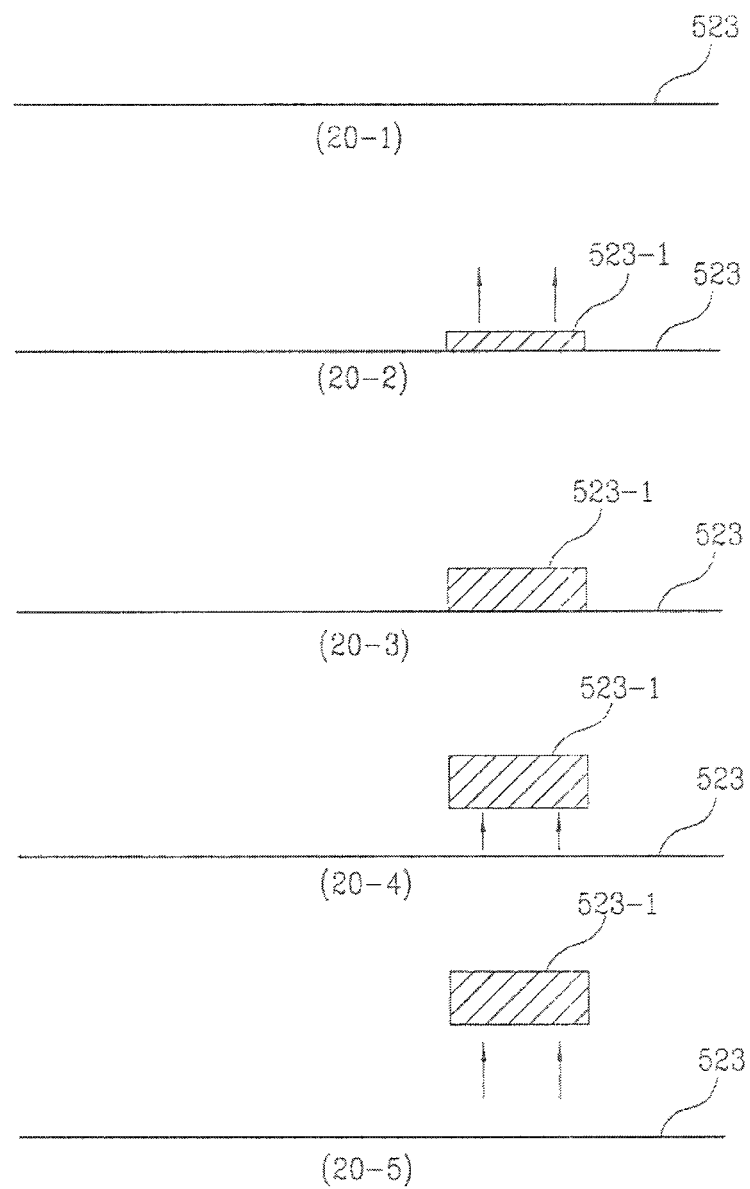

In (20-1) of FIG. 20, the $3^{rd}$ line symbol 523 before setting a bookmark at the third page is shown.

As mentioned in the foregoing description, if the bookmark is set at the third page, referring to (20-2) and (20-3), the bookmark indicator 523-1 can be generated in a manner of growing from the $3^{rd}$ line symbol 523.

Meanwhile, as mentioned in the foregoing description, if the bookmark setting is released from the third page, referring to (20-4) and (20-5) of FIG. 20, the bookmark indicator 523 is gradually detached from the $3^{rd}$ line symbol 523 and then disappears over one side of the first subdisplay 500.

According to the descriptions with reference to FIG. 19 and FIG. 20, when the main display 400 and the second subdisplay 600 are simultaneously touched and dragged, the bookmark is set at the corresponding page and is then released from the corresponding page. Yet, the simultaneous touch & drag needs not to be limited to the bookmark setting and release. This is explained with reference to FIG. 21 and FIG. 22 as follows.

Referring to (21-1) of FIG. 21, the first page of the e-book is being displayed on the main display 400 and $1^{st}$ to $3^{rd}$ line symbols 521 to 523 corresponding to the three pages respectively are being displayed on the first subdisplay 500.

Referring to (21-1) and (21-2) of FIG. 21, the main display 400 and the second subdisplay 600 are simultaneously touched and a drag is performed in top-to-bottom direction.

If so, referring to (21-2) and (21-3) of FIG. 21, the controller 180 is controls the first page to disappear gradually by being synchronized with the drag and also controls a next page (i.e., the second page) to be displayed. The disappearing first page can be erased from the e-book.

For example, referring to (21-3) of FIG. 21, as the first page is deleted, the $1^{st}$ line symbol 523 corresponding to the first page is not displayed on the first subdisplay 500 any more.

The following description is made with reference to FIG. 22.

Referring to (22-1) of FIG. 22, the first page of the e-book is displayed on the main display 400. The main display 400 and the second subdisplay 600 are simultaneously touched and a drag is then performed in bottom-to-top direction.

If so, at least one portion of a content of the first page is copied. For instance, if a portion of the content of the first page is blocked in advance for example, the blocked content is copied only. Alternatively, if the content of the first page is entirely blocked in advance or none of the content of the first page is blocked in advance, the entire content of the first page can be copied. Since it is apparent to those skilled in the art that the content of the page can be partially blocked, its details are omitted from the following description for clarity.

Subsequently, referring to (22-2) of FIG. 22, if a touch & drag is performed on the main display 400 in right-to-left direction, the first page disappears and the second page is displayed.

Referring to (22-3) of FIG. 22, after both of the main display 400 and the second subdisplay 600 have been simultaneously touched, a drag is performed in top-to-bottom direction.

If so, the copied content of the first page is pasted with the second page. This paste operation can be performed at a point specified in a manner of performing a previous touch to the second page.

Accordingly, the present invention provides the following effects and/or advantages.

According to at least one of embodiments of the present invention, when a touchscreen is attached to at least two sides of a mobile terminal, a terminal user is facilitated to use the mobile terminal in a manner of utilizing how to display the touchscreen provided to the at least two sides.

It will be apparent to those skilled in the art that various modifications and variations can be specified into other forms without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a housing;
   a main display unit provided to a front side of the housing;
   a first subdisplay unit provided to a top side of the housing;
   a second subdisplay unit provided to a backside of the housing, the top side of the housing being between the front side and the backside; and
   a controller to control the main display unit, the first subdisplay unit and the second subdisplay unit,
   wherein the controller controls a plurality of objects to be displayed on the main display unit,
   wherein when a first touch gesture is performed with respect to a specific one of the plurality of objects displayed on the main display unit, the controller controls the specific object in a first direction to move from the main display unit to the first subdisplay unit and then to move the specific object from the first subdisplay unit to the second subdisplay unit,
   wherein the controller controls the main display unit to display a function window on the main display unit according to an execution of a prescribed function, and when a prescribed touch gesture is performed on the function window at a prescribed timing point, the controller further controls a function icon having execution progress status information at the prescribed timing point of the function to be displayed on the second subdisplay unit,
   wherein when the prescribed touch gesture is performed, the controller controls the execution of the function to be automatically stopped and also controls the function window to disappear from the main display unit, and
   wherein when the prescribed touch gesture is performed on the function icon displayed on the second subdisplay unit, the controller controls the function icon to disappear from the second subdisplay unit and controls the function to be executed on the main display unit in a manner of being continuous with an execution progress status at the prescribed timing point.

2. The mobile terminal of claim 1, wherein the housing is a bar type.

3. The mobile terminal of claim 1, wherein at least the main display unit and the second subdisplay unit comprise a touchscreen.

4. The mobile terminal of claim 3, wherein at least the first subdisplay unit and the second subdisplay unit comprise a flexible LCD.

5. The mobile terminal of claim 3, wherein when a second touch gesture is performed on the specific object displayed on the second subdisplay unit, the controller controls the specific object to move from the second subdisplay unit to the first display unit and then to the main display unit.

6. The mobile terminal of claim 1, wherein each of the first and second touch gestures comprises a flicking touch gesture toward the first subdisplay unit.

7. The mobile terminal of claim 1, wherein when the specific object comprises a moving or still picture image, the controller controls the image to be displayed as a thumbnail on the second subdisplay unit.

8. The mobile terminal of claim 1, wherein in proportion to a number of objects displayed on the second subdisplay unit, the controller controls sizes of the objects displayed on the second subdisplay unit such that the sizes decrease as the number of objects increases.

9. The mobile terminal of claim 1, wherein after the function icon has been generated from the main display unit, the controller controls the function icon to move to the first subdisplay unit and then move to the second subdisplay unit.

10. The mobile terminal of claim 3, wherein when a list of the plurality of objects is displayed on the main display unit and a touch & drag is performed on the main display unit, the controller further controls the list to be scrolled to correspond to a length of the touch & drag and then controls the scrolled list to be continuously displayed on the main display unit and the second subdisplay unit.

11. The mobile terminal of claim 10, wherein the controller controls an indicator bar to be displayed on the main display unit together with the list, and wherein when the touch & drag is performed on the main display unit, the controller controls the indicator bar to be scrolled into the second subdisplay unit together with the list or controls the indicator bar to be displayed on the first subdisplay unit.

12. The mobile terminal of claim 1, wherein when at least one multimedia object is executed on the main display unit and a prescribed touch gesture is performed on the main display unit, the controller further controls relevant information of the multimedia object to be displayed on the second subdisplay unit.

13. The mobile terminal of claim 12, further comprising a sensor configured to sense a motion of the housing,
   wherein when the housing is moved or rotated in a prescribed direction, the controller controls another relevant information relevant to the multimedia object to be displayed on the second subdisplay unit.

14. A method of controlling a mobile terminal, comprising:
   displaying at least one object on a main display unit of a touchscreen type provided to a front side of a housing of a bar type;

when a first touch gesture is performed on the object, moving the object from the main display unit to a first subdisplay unit provided to a top side of the housing and then moving the object from the first subdisplay unit to a second subdisplay unit of the touchscreen type provided to a backside of the housing, wherein the top side of the housing is between a top edge of the front side of the housing and a top edge of the backside of the housing;

when a second touch gesture is performed on the object displayed on the second subdisplay unit, moving the object from the second subdisplay unit to the first subdisplay unit and then moving the object from the first subdisplay unit to the main display unit;

displaying a function window on the main display unit according to an execution of a prescribed function;

when a prescribed touch gesture is performed on the function window at a prescribed timing point, controlling a function icon having execution progress status information at the prescribed timing point of the function to be displayed on the second subdisplay unit;

when the prescribed touch gesture is performed, controlling the execution of the function to be automatically stopped and controlling the function window to disappear from the main display unit; and when the prescribed touch gesture is performed on the function icon displayed on the second subdisplay unit, controlling the function icon to disappear from the second subdisplay unit and control the function to be executed on the main display unit in a manner of being continuous with an execution progress status at the prescribed timing point.

15. The mobile terminal of claim 1, wherein the specific object is located at a specific position on the second subdisplay unit after moving to the second subdisplay unit, and wherein when a second touch gesture is performed with respect to the main display unit, the controller further controls the remainder of the plurality of objects to scroll in a second direction perpendicular to the first direction on the main display unit while controlling the specific object to remain displayed at the same specific position on the second subdisplay unit.

16. The method of claim 14, wherein when the object is displayed on both the first subdisplay unit and the second subdisplay unit while moving across a boundary between the first subdisplay unit and the second subdisplay unit, the object is oriented such that a top side of the object faces toward a bottom side of the housing.

17. The method of claim 16, wherein when the object is displayed only on the second subdisplay unit after moving across the boundary between the first subdisplay unit and the second subdisplay unit, the object is oriented such that the top side of the object faces toward the top side of the housing.

18. The mobile terminal of claim 1, wherein the controller controls orientation of the display of the specific object such that a top side of the specific object faces toward a bottom side of the housing, when the specific object is displayed on both the first subdisplay unit and the second subdisplay unit while moving across a boundary between the first subdisplay unit and the second subdisplay unit.

19. The mobile terminal of claim 18, wherein the controller changes the orientation of the display of the specific object such that the top side of the specific object faces toward the top side of the housing, when the specific object is displayed only on the second subdisplay unit after moving across the boundary between the first subdisplay unit and the second subdisplay unit.

* * * * *